(12) United States Patent
Asahi

(10) Patent No.: US 6,541,688 B2
(45) Date of Patent: Apr. 1, 2003

(54) ELECTRONIC MUSICAL INSTRUMENT WITH PERFORMANCE ASSISTANCE FUNCTION

(75) Inventor: Yasuhiko Asahi, Iwata (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/033,570

(22) Filed: Dec. 27, 2001

(65) Prior Publication Data
US 2002/0083818 A1 Jul. 4, 2002

(30) Foreign Application Priority Data
Dec. 28, 2000 (JP) ...................................... 2000-402168

(51) Int. Cl.[7] .............................................. G09B 15/04
(52) U.S. Cl. ...................................................... 84/477 R
(58) Field of Search .............................. 84/477 R, 478

(56) References Cited

U.S. PATENT DOCUMENTS

| 4,437,378 A | * | 3/1984 | Ishida et al. ............... 84/478 X |
| 5,907,115 A | * | 5/1999 | Matsunaga et al. ........ 84/477 R |
| 6,078,004 A | * | 6/2000 | Eitaki ........................ 84/477 R |
| 6,342,663 B1 | * | 1/2002 | Kato ......................... 84/478 X |
| 6,380,470 B1 | * | 4/2002 | Fujiwara et al. .......... 84/478 X |
| 6,380,473 B2 | * | 4/2002 | Uehara ..................... 84/478 X |

FOREIGN PATENT DOCUMENTS

JP    10-161655    6/1998

* cited by examiner

Primary Examiner—Stanley J. Witkowski
(74) Attorney, Agent, or Firm—Morrison & Foerster LLP

(57) ABSTRACT

An electronic musical apparatus assists a performance based on music performance data of a model music piece composed of a plurality of notes allocated to a plurality of channels. Each note is determined by a target pitch and timing. An indicator section visually indicates the target timings of the notes. An input section is operable by a user for sequentially inputting actual timings selectively allocated to one or more of the channels during the performance. A detecting section operates when the input section inputs an actual timing to one channel, for detecting a note having a target timing which matches the inputted actual timing and which is allocated to any one of the channels. An output section responds to the detecting section for outputting the music performance data to the respective channels for sounding all of the notes having the target timings coincident with the inputting of the actual timing.

79 Claims, 12 Drawing Sheets

MODE a:
SOUNDING C,E,G,C,
AND E

MODE b:
SOUNDING C,E,
AND G

MODE c:
SOUNDING C

MODE d:
SOUNDING C,E,G,C,
AND E

MODE e:
SOUNDING C,E,G,C,
AND E

MODE f:
SOUNDING C AND E

FIG.3 (a)

| | |
|---|---|
| 21a | SONG NUMBER DATA (1) |
| 21b | MODE SETUP DATA |
| 21c | APC (AUTO-PLAY CHORD) |
| 21d | APM (AUTO-PLAY MELODY) |
| | SONG NUMBER (2) |
| | MODE SETUP DATA |
| | APC (AUTO-PLAY CHORD) |
| | APM (AUTO-PLAY MELODY) |
| | SONG NUMBER (3) |
| | MODE SETUP DATA |
| | APC (AUTO-PLAY CHORD) |
| | APM (AUTO-PLAY MELODY) |

| ADR1 | Chord | A (ADR1) |
|---|---|---|
| 1 | $C_M$ | 0.0 |
| 2 | ... | ... |
| 3 | ... | ... |
| . | ... | ... |
| . | ... | ... |
| . | ... | ... |
| . | ... | ... |
| . | ... | ... |

| ADR2 | Melody | A (ADR2) |
|---|---|---|
| 1 | G3 | 0.0 |
| 2 | E3 | ... |
| 3 | D3 | ... |
| . | ... | ... |
| . | ... | ... |
| . | ... | ... |
| . | ... | ... |
| . | ... | ... |

FIG.4 (a)

| $C_M$ | C : 5,3<br>E : 4,2<br>G : 3,0<br>C : 2,1<br>E : 1,0 |
|---|---|
| ... | ..... |
| ... | ..... |

FIG.4 (b)

| C2 | 5,3 |
|---|---|
| C#2 | 5,4 |
| D2 | 4,0 |
| D#2 | 4,1 |
| E2 | 4,2 |
| ... | ... |
| ... | ... |
| ... | ... |
| ... | ... |
| ... | ... |
| ... | ... |
| ... | ... |
| ... | ... |

ELECTRONIC MUSICAL INSTRUMENT WITH PERFORMANCE ASSISTANCE FUNCTION

BACKGROUND OF THE INVENTION

1. Technical Field

The present invention relates to an electronic musical instrument with performance assistance function for guiding (navigating) a performance when a player practices on guitar-like musical instruments such as the classical guitar, electric guitar, electric bass, classic guitar, ukulele, etc. whose performance requires synchronized manipulation timing between right and left hands.

2. Prior Art

Playing the guitar requires synchronization between right and left hands for different operations, namely fret and string operations. As a possible method, for example, the right hand is first used just for a practice of picking strings. As the skill advances, the practice is gradually made more complicated by adding a practice of the left hand for pressing strings.

Conventionally, already known is a guitar-like electronic musical instrument which guides the performance simply by illuminating the fret. However, there has been no electronic musical instrument that enables practices according to gradual steps.

SUMMARY OF THE INVENTION

The present invention has been made for solving the aforementioned problems. It is therefore an object of the present invention to provide an electronic musical instrument with performance assistance function which can simplify the user's performance operation by supporting user's performance operations and can check correctness of the performance operation.

In a first aspect of the invention, there is provided an electronic musical apparatus with assistance for a performance based on music performance data representative of a model music piece composed of a plurality of notes allocated to a plurality of channels, each note being determined in terms of a target pitch and a target timing. The apparatus is comprised of an indicator section that visually indicates the target timings of the notes in correspondence with the respective channels according to the music performance data to thereby visually prompt a progression of the model music piece, an input section operable by a user for sequentially inputting actual timings selectively allocated to one or more of the channels during the course of the performance of the model music piece, a detecting section operative when the input section inputs an actual timing to one channel, for detecting a note having a target timing which matches the inputted actual timing and which is allocated to any one of the channels, and an output section responsive to the detecting section for outputting the music performance data to the respective channels for sounding all of the notes having the target timings coincidentally with the inputting of the actual timing.

Accordingly, only if the sound timing is input correctly, the apparatus sounds a musical note by not only specifying a channel for sound timing input, but also specifying a pitch. As a result, it is possible to simplify the user's performance operation and check the sound timing input.

For respective channels, it is possible to simplify a user's performance operation by means of the guide function according to indicator means, which at least visualizes target sound timing.

At the same target sound timing, model music data may comprise one note or a plurality of notes like in chord tones. When model music data is a chord, a chord name is entered and is converted to a plurality of chord tones. These tones are entered as a plurality of notes as model music data.

In a second aspect of the invention, there is provided an electronic musical apparatus with assistance for a performance based on music performance data representative of a model music piece composed of a plurality of notes allocated to a plurality of channels, each note being determined in terms of a target pitch and a target timing, the model music piece containing a set of notes having the same target timing. The inventive apparatus is comprised of an indicator section that visually indicates the target timings of the notes in correspondence with the respective channels according to the music performance data to thereby visually prompt a progression of the model music piece, an input section operable by a user for sequentially inputting actual timings selectively allocated to one or more of the channels during the course of the performance of the model music piece, a detecting section operative when the input section inputs an actual timing to one or more channel, for detecting a note having a target timing which matches the inputted actual timing and which is allocated to said one or more channel among the set of the notes, and an output section responsive to the detecting section for outputting the music performance data to said one or more channel, thereby sounding the detected note at the target pitch through said one or more channel.

Accordingly, only if the sound timing is correctly input for a channel corresponding to at least one of a plurality of notes at the same target sound timing, a pitch for that channel is automatically input and sounded. As a result, it is possible to simplify a user' performance operation and check sound timing input for the correct channel.

For respective channels, it is possible to simplify a user's performance operation by means of the guide function according to indicator means, which at least visualizes target sound timing.

In a third aspect of the invention, there is provided an electronic musical apparatus with assistance for a performance based on music performance data representative of a model music piece composed of a plurality of notes allocated to a plurality of channels, the model music piece containing a single note allocated to a specified channel, each note being determined in terms of a target pitch and a target timing. The inventive apparatus is comprised of an indicator section that visually indicates the target timings of the notes in correspondence with the respective channels according to the music performance data to thereby visually prompt a progression of the model music piece, an input section operable by a user for sequentially inputting actual timings selectively allocated to one or more of the channels during the course of the performance of the model music piece, a detecting section operative when the input section inputs an actual timing to the specified channel, for detecting a single note having a target timing which matches the inputted actual timing and which is allocated to the specified channel, and an output section responsive to the detecting section for outputting the music performance data to the specified channel, thereby sounding the detected single note at the target pitch through the specified channel.

Accordingly, only if the sound timing is correctly input for a channel corresponding to one note, a pitch for that channel is automatically input and sounded. As a result, it is possible to simplify a user' performance operation and check sound timing input for a correct channel.

For respective channels, it is possible to simplify a user's performance operation by means of the guide function according to indicator means which at least visualizes target sound timing.

In a fourth aspect of the invention, there is provided an electronic musical apparatus with assistance for a performance based on music performance data representative of a model music piece composed of a plurality of notes allocated to a plurality of channels, each note being determined in terms of a target pitch and a target timing. The inventive apparatus is comprised of an indicator section that visually indicates the target timings of the notes in correspondence with the respective channels according to the music performance data to thereby visually prompt a progression of the model music piece, an input section operable by a user for sequentially inputting actual timings selectively allocated to one or more of the channels during the course of the performance of the model music piece, a selecting section that selects either of a first mode applicable when the model music piece contains one or more notes at one timing, a second mode applicable when the model music piece contains multiple notes at one timing and a third mode applicable when the model music piece contains a single note at one timing, and an output section being operative when the input section inputs an actual timing to one channel under the first mode, for detecting a note having a target timing which matches the inputted actual timing and which is allocated to any one of the channels, and then outputting the music performance data to the respective channels for sounding all of the notes having the target timings coincidentally with the inputting of the actual timing, the output section being operative when the input section inputs an actual timing to one or more channel under the second mode for detecting a note having a target timing which matches the inputted actual timing and which is allocated to said one or more channel among the multiple notes, and then outputting the music performance data to said one or more channel, thereby sounding the detected note at the target pitch through said one or more channel, and the output section being operative when the input section inputs an actual timing to a specified channel under the third mode for detecting a single note having a target timing which matches the inputted actual timing and which is allocated to the specified channel, and then outputting the music performance data to the specified channel, thereby sounding the detected single note at the target pitch through the specified channel.

Accordingly, it is possible to select at least two of performance assist modes described in the first, second and third aspects of the invention. As a result, it is possible to simplify a user' performance operation and check sound timing input, and stepwise guide the user to master performance.

For respective channels, it is possible to simplify a user's performance operation by means of the guide function according to indicator means, which at least visualizes target sound timing.

In a fifth aspect of the invention, there is provided an electronic musical apparatus with assistance for a performance based on music performance data representative of a model music piece composed of a plurality of notes allocated to a plurality of channels, each note being determined in terms of a target pitch and a target timing. The inventive apparatus is comprised of an indicator section that visually indicates the target timings and the target pitches of at least a part of the notes in correspondence with the respective channels according to the music performance data to thereby visually prompt a progression of the model music piece, a timing input section operable by a user for inputting a current timing to any one or more of the channels, a pitch input section operable by a user for inputting an actual pitch to a particular channel, a detecting section that detects a note having a target timing matching the current timing and a target pitch matching the actual pitch in the particular channel, and an output section responsive to the detecting section for outputting the music performance data to the respective channels for sounding the detected note and other note having the target timing matching the current timing.

Accordingly, only if a pitch is correctly specified and entered for any of the aforementioned channels and the sound timing is correctly entered, the apparatus can specify and generate a lacking pitch at a channel for which the sound timing should be entered. As a result, it is possible to simplify a user' performance operation, specify a pitch, and check sound timing input.

It is possible to simplify a user's performance operation by means of the guide function according to indicator means which visualizes the target pitch and the target sound timing corresponding to at least part of notes for respective channels.

At the same target sound timing, model music data may comprise one note or a plurality of notes like in chord tones.

In a sixth aspect of the invention, there is provided an electronic musical apparatus with assistance for a performance based on music performance data representative of a model music piece composed of a plurality of notes allocated to a plurality of channels, each note being determined in terms of a target pitch and a target timing. The inventive apparatus is comprised of an indicator section that visually indicates the target pitches and the target timings of the notes in correspondence with at least a part of the channels according to the music performance data to thereby visually prompt a progression of the model music piece, a timing input section operable by a user for inputting a current timing to a first channel, a pitch input section operable by a user for inputting an actual pitch to a second channel, a detecting section that detects one note having a target timing matching the current timing and a target pitch matching the actual pitch in the second channel, and that detects another note having a target timing matching the current timing in the first channel, and an output section responsive to the detecting section for outputting the music performance data to the respective channels, thereby sounding all of the notes having the target timing matching the current timing and including said one note and said another note.

Accordingly, only if a pitch is correctly specified and entered for any channel at the sound timing is correctly specified for any channel, the apparatus can specify and generate a lacking pitch at a channel for which the sound timing should be entered. As a result, it is possible to simplify a user' performance operation, specify a pitch, and check sound timing input.

It is possible to simplify a user's performance operation by means of the guide function according to indicator means which visualizes the target pitch and the target sound timing corresponding to at least part of notes for respective channels.

At the same target sound timing, model music data may comprise one note or a plurality of notes like in chord tones.

In a seventh aspect of the invention, there is provided an electronic musical apparatus with assistance for a performance based on music performance data representative of a model music piece composed of a plurality of notes allocated to a plurality of channels, each note being determined in terms of a target pitch and a target timing. The inventive apparatus is comprised of an indicator section that visually indicates the target pitches and the target timings of the notes in correspondence with the channels according to the music performance data to thereby visually prompt a progression of the model music piece, a timing input section operable by a user for inputting a current timing to a first channel, a pitch input section operable by a user for inputting an actual pitch to a second channel, a detecting section that detects a note having a target timing matching the current timing and a target pitch matching the actual pitch in the second channel, and further detects that the first channel inputted with the current timing is identical to the second channel inputted with the actual pitch, and an output section responsive to the detecting section for outputting the music performance data to the second channel, thereby sounding the detected note.

Accordingly, it is possible to specify a pitch and check sound timing input.

It is possible to simplify a user's performance operation by means of the guide function according to indicator means which visualizes the target pitch and the target sound timing for respective channels.

At the same target sound timing, model music data may comprise one note or a plurality of notes like in chord tones.

In an eighth aspect of the invention, there is provided an electronic musical apparatus with assistance for a performance based on music performance data representative of a music piece composed of a plurality of notes being allocated to a plurality of channels and including a set of notes constituting a chord, each note being determined in terms of a target pitch and a target timing. The inventive apparatus is comprised of an indicator section that visually indicates at least the target timings of the notes in correspondence with the channels according to the music performance data to thereby visually prompt a progression of the music piece, a timing input section operable by a user for inputting a current timing to a channel, a detecting section for detecting that the inputted current timing matches a target timing of one of the notes constituting the chord, and an output section responsive to the detecting section for outputting the music performance data to the respective channels, thereby sounding the notes constituting the chord and having the target timing matching the current timing while suppressing the sounding of other note which is not involved in the chord.

Accordingly, only if the sound timing is correctly entered for a channel corresponding to any one of chord notes, the apparatus sounds these notes by not only specifying channels for the other chord notes, but also specifying a pitch of each chord note. As a result, it is possible to simplify the user's performance operation and check the sound timing input.

On a music score, a rest may be inserted between notes. As performance data in this case, rest data is not always needed if note data is specified with the sound timing.

It is possible to simplify a user's performance operation by means of the guide function according to indicator means which visualizes at least the target sound timing for respective channels.

If the sound timing is input to a channel other than channels for chord notes, no data is output for a note which does not constitute the chord. This operation does not sound a note which would disturb the harmonic relationship of the chord.

As will be clearly understood from the above description, the present invention provides an advantage of assisting user's performance operations and checking operations by partly automating operations such as specifying pitches and entering sound timing. Further, the present invention provides an advantage of guiding the performance through the use of indicator means for visualizing the target sound timing for respective channels.

The user can practice only picking operations or a combination of fretting and picking operations, thereby gradually mastering the performance skill.

In a ninth aspect of the invention, the inventive electronic musical apparatus further comprises a data input section that inputs the music performance data designed to specify allocation of the notes to the channels and also designed to specify the target pitch and the target timing of each note in each channel.

Accordingly, the inputted music performance data can be utilized as it is to assist in the music performance of the model music piece without further processing of the inputted music performance data by a lookup table for allocation of the notes to the channels.

In a tenth aspect of the invention, the inventive electronic musical apparatus further comprises a data input section that inputs the music performance data which contains note event data effective to specify the target timing and the target pitch of each note, and an allocating section that allocates each note to an appropriate channel according to the specified target pitch of each note along with the specified target timing.

Accordingly, the music performance data having no channel information can be used to assist in the music performance of the model music piece by allocating the notes to the appropriate channels based on the pitch of the notes.

In an eleventh aspect of the invention, the inventive electronic musical apparatus further comprises a data input section that inputs the music performance data which contains chord event data effective to specify a plurality of chords and which is arranged to specify the target timing of each chord, and an allocating section that specifies a set of notes constituting each chord according to the chord event data and that allocates the set of the notes to appropriate channels along with the specified target timing.

Accordingly, the music performance data containing chord data can be sufficiently used to assist in the music performance of the model music piece even if the music performance data has no channel information and no target pitch information of each chord note.

In a twelfth aspect of the invention, the data input section inputs the music performance data, which contains time information effective to prescribe the target timing of each note.

The music performance data may be inputted in the digital data form such as an auto play file, a standard MIDI file and a dedicated MIDI file for sequencer software. Such a format of the music performance data can be stream reproduced or downloaded from a server through Internet or LAN.

In a thirteenth aspect of the invention, the data input section inputs the music performance data, which contains manual timing inputs effective to specify the target timing of each note.

Accordingly, the target timings of the notes constituting the model music piece can be designated by timing inputs on a manual music keyboard or else. Such a music performance data can be inputted in the form of MIDI data externally through a MIDI interface in realtime basis. Such a music performance data may be provided from a server through Internet or LAN in realtime basis.

BRIEF DESCRIPTION OF THE DRAWINGS

FIGS. 3(a)–(c) exemplify an auto-play file which records song data to be used for an embodiment of the present invention.

FIGS. 4(a) and (b) illustrate a lookup table for converting the chord name or the pitch name to a string channel number and a fret number.

DETAILED DESCRIPTION OF THE INVENTION

Figure 1:
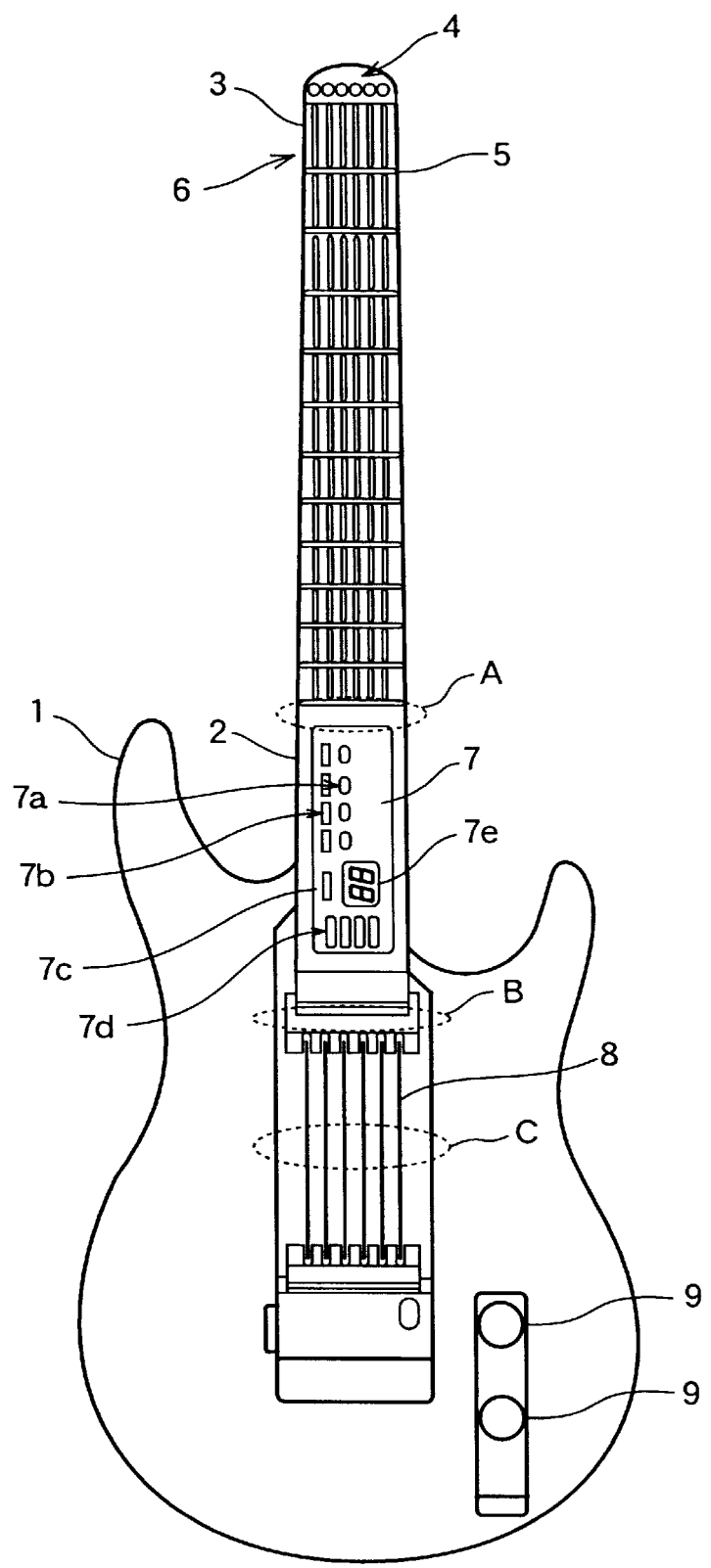
FIG. 1 shows the structure of a guitar-like electronic musical instrument as an embodiment of the electronic musical instrument with performance assistance function according to the present invention.

FIG. 1 shows the structure of a guitar-like electronic musical instrument as an embodiment of the electronic musical instrument with performance assistance function according to the present invention.

In the figure, the reference numeral 1 represents a musical instrument body, 2 a neck, and 3 a fingerboard mounted on the surface of the neck. The reference numeral 4 denotes an open string notification LED (light emitting diode). There are six LEDs corresponding to string positions of the model guitar at the end of the neck 2 in correspondence to the top of the fingerboard 3. The open string notification LED 4 is illuminated to provide the user with guidance for picking an open string.

It may be preferable to provide the open string notification LEDs 4 corresponding to the string positions at the bottom of the fingerboard 3 indicated by a letter A.

The reference numeral 5 represents a fret provided on the fingerboard 3 in the same manner as a typical guitar. The reference numeral 6 denotes a illuminating LED-equipped fret switch provided on the fingerboard 3 corresponding to a string position of the guitar. There are six columns of switches corresponding to six strings. Each column is separated by the fret 5 and comprises 12 illuminating LED-equipped fret switches 6.

While pressing a string specifies a corresponding pitch on a typical guitar, pressing the illuminating LED-equipped fret switch 6 specifies the corresponding pitch on this electronic musical instrument.

The illuminating LED-equipped fret switch 6 uses an LED for illumination. It is controlled based on song data or music performance data representing a model music piece, and illuminates at the timing for pressing the corresponding position. The LED illumination provides guidance for pressing the illuminating LED-equipped fret switch 6 and picking the corresponding string.

The reference numeral 7 represents an operation panel provided with a mode selection switch 7a, a song selection switch 7b, a start/stop switch 7c, a timbre switch 7d, and a number display LED 7e.

The mode selection switch 7a specifies an operation mode. There are provided PLAY1 to PLAY4 modes. The song selection switch 7b selects one of a plurality of model songs stored in an auto-play file. In the example shown, there are four song selection switches which respectively specify first to fourth songs.

Each press of the start/stop switch 7c starts or stops the auto-play operation. The timbre switch 7d specifies a timbre of a song sounded by performance. In the example, four switches are used for specifying timbres of a classical guitar, folk guitar, electric guitar, and electric bass. It may be preferable to assign a slightly different timbre to each string to be plucked. Timbres are not limited to guitar based, but can be those of a piano, harpsichord, glockenspiel, sansi, etc. The number display LED 7e displays a mode, song number, timbre number, etc.

The reference numeral 8 represents a plucking member which is provided just below the fingerboard 3 on the musical instrument body 1. There are six plucking members corresponding to six strings of the guitar.

Each string of the plucking member 8 approximately has a horseshoe shape. When a user picks the string, the plucking member 8 is displaced horizontally. This displacement bends a piezo sensor inside the musical instrument body 1. When a user picks the string 8, the piezo sensor generates a trigger signal. This trigger signal inputs the sound timing.

In the example shown, the plucking member 8 is not provided with a direct plucking indication guide. However, it may be preferable to arrange an LED for indicating the timing to pick each plucking member 8 at position B near each plucking member 8 or at position C just below each plucking member 8, for example.

The reference numeral 9 denotes a manipulation unit for a volume control, data input encoder, etc.

The illuminating notification device is not limited to an LED. The illuminating LED-equipped fret switch 6 may separately comprise an illuminating notification section and a switch section arranged adjacently to each other.

Figure 2:
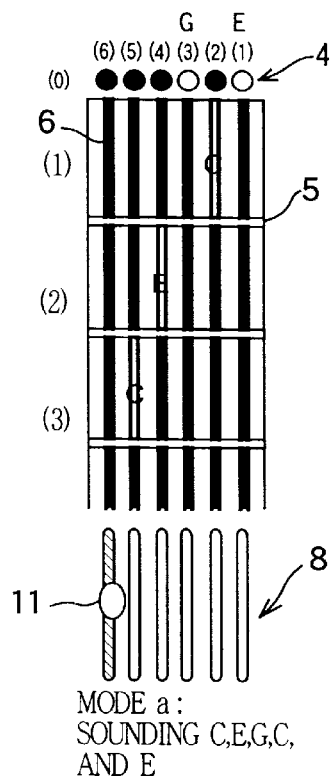
FIGS. 2(a)–(f) illustrate examples of various operation modes implemented by an embodiment of the present invention.
Figure 2:
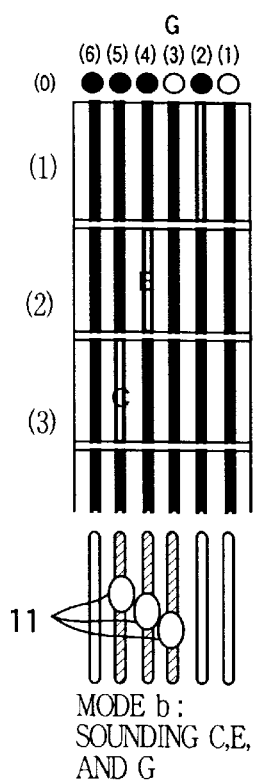
Figure 2:
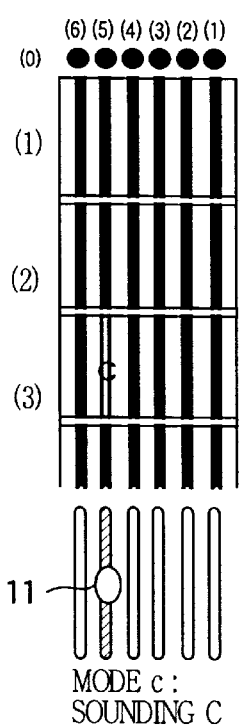
Figure 2:
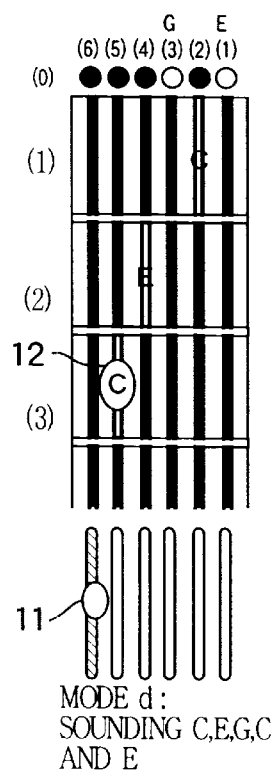
Figure 2:
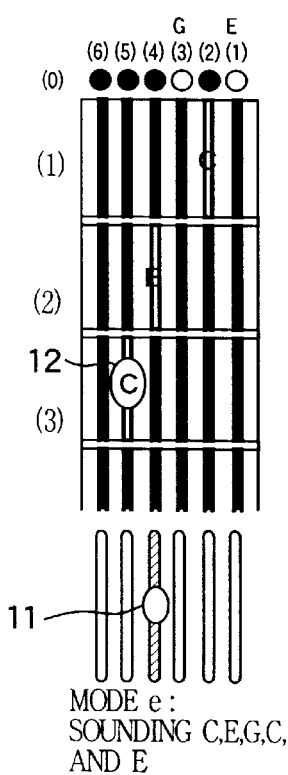
Figure 2:
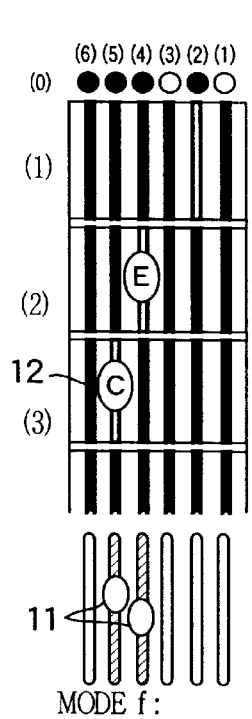

FIG. 2 illustrates examples of various operation modes implemented by an embodiment of the present invention.

FIG. 2 schematically shows a part of the fingerboard 3 and the plucking member 8 in FIG. 1. Horizontally arranged numbers in parentheses correspond to string numbers. Vertically arranged numbers in parentheses correspond to fret numbers. An open string is indicated by fret number (0) for the sake of convenience. FIG. 2 uses the same reference numerals as those shown in FIG. 1. A hatched string corresponds to the plucking member 8 to be picked. The reference numeral 11 denotes a picking finger for easy understanding of the picked plucking member 8. The reference numeral 12 represents a fretting finger for easy understanding of the pressed illuminating LED-equipped fret switch 6.

In any of the operation modes, the illuminating LED-equipped fret switch 6 lights in corresponding to apposition to be pressed during performance according to model song data. In the figure, it is assumed that a switch in black turns off and a switch in white turns on. This also applies to the open string notification LED 4.

The embodiment of the present invention simplifies and checks user operations by automating a part of picking and fretting operations, thereby assisting a user in gradually improving the performance skill for mastering. Basically, the degree of assistance decreases and the performance difficulty increases in the order of modes a to f in FIG. 2.

FIGS. 2(a) to 2(c) are modes for especially simplified operations. These modes are referred to as ultra-easy (ultra EZ) modes for the sake of convenience.

Though these three modes do not require a fretting operation, it is possible to press the illuminating LED-equipped fret switch 6.

When at least one illuminating LED-equipped fret switch 6 or one open string notification LED 4 turns on in mode a of FIG. 2(a), this state prompts picking of a string for the corresponding string number. This state indicates an operation of picking at least one plucking member 8 with the right hand (single-trigger).

In this case, picking of the string sounds all tones corresponding to the enabled illuminating LED-equipped fret switch 6 (the $C_M$ chord in the example). Since any plucking member 8 can be picked, it is possible to pick the sixth string, which is not indicated to be picked.

The timing for a picking operation needs to be within duration of a progressing note. Only if this timing is correct, the apparatus sounds the note by specifying a string to be picked while mechanically performing a fretting operation.

Accordingly, there is provided the inventive electronic musical apparatus with assistance for a performance based on music performance data representative of a model music piece composed of a plurality of notes allocated to a plurality of channels corresponding to guitar strings, each note being determined in terms of a target pitch and a target timing. In the mode a of the inventive apparatus, an indicator section composed of LED 4 and LED equipped in the fret switch 6 visually indicates the target timings of the notes in correspondence with the respective channels according to the music performance data to thereby visually prompt a progression of the model music piece. An input section composed of the plucking member 8 is operable by a user for sequentially inputting actual timings selectively allocated to one or more of the channels (namely, strings) during the course of the performance of the model music piece. A detecting section operates when the input section inputs an actual timing to one channel, for detecting a note having a target timing which matches the inputted actual timing and which is allocated to any one of the channels. An output section responds to the detecting section for outputting the music performance data to the respective channels for sounding all of the notes having the target timings coincident with the inputting of the actual timing.

When at least one illuminating LED-equipped fret switch 6 or one open string notification LED 4 turns on in mode b of FIG. 2(b), this mode indicates an operation of picking multiple plucking members 8 to be picked with the right hand (all trigger). Here, the "all trigger" does not mean picking all six strings, but means picking one or more strings in the same manner as usual performance.

Obviously, picking all strings to be picked sounds all tones corresponding to the enabled illuminating LED-equipped fret switches 6 (the $C_M$ chord in the example).

In this mode, as shown in the figure, picking only some of strings to be picked just sounds notes having pitches corresponding to these string numbers indicated by the illuminating LED-equipped fret switches 6 or the open string notification LEDs 4.

Namely, the apparatus sounds only a tone corresponding to the correctly picked string while mechanically performing the fretting operation.

Accordingly, there is provided the inventive electronic musical apparatus with assistance for a performance based on music performance data representative of a model music piece composed of a plurality of notes allocated to a plurality of channels, each note being determined in terms of a target pitch and a target timing, the model music piece containing a set of notes having the same target timing. In the mode b of the inventive apparatus, the indicator section visually indicates the target timings of the notes in correspondence with the respective channels according to the music performance data to thereby visually prompt a progression of the model music piece. The input section is operable by a user for sequentially inputting actual timings selectively allocated to one or more of the channels during the course of the performance of the model music piece. The detecting section operates when the input section inputs an actual timing to one or more channel, for detecting a note having a target timing which matches the inputted actual timing and which is allocated to said one or more channel among the set of the notes. The output section responds to the detecting section for outputting the music performance data to said one or more channel, thereby sounding the detected note at the target pitch through said one or more channel.

Mode c in FIG. 2(c) is used for performing a melody, for example. When a single illuminating LED-equipped fret switch 6 or single open string notification LED 4 turns on, this operation mode allows the right hand to pick a single corresponding plucking member 8.

The apparatus sounds only a tone corresponding to the correctly picked string while mechanically performing the fretting operation.

Accordingly, there is provided the inventive electronic musical apparatus with assistance for a performance based on music performance data representative of a model music piece composed of a plurality of notes allocated to a plurality of channels, the model music piece containing a single note allocated to a specified channel, each note being determined in terms of a target pitch and a target timing. In the mode c of the inventive apparatus, the indicator section visually indicates the target timings of the notes in correspondence with the respective channels according to the music performance data to thereby visually prompt a progression of the model music piece. The input section is operable by a user for sequentially inputting actual timings selectively allocated to one or more of the channels during the course of the performance of the model music piece. The detecting section operates when the input section inputs an actual timing to the specified channel, for detecting a single note having a target timing which matches the inputted actual timing and which is allocated to the specified channel. The output section responds to the detecting section for outputting the music performance data to the specified channel, thereby sounding the detected single note at the target pitch through the specified channel.

During melody performance, a plurality of notes having different pitches may be sounded by picking a plurality of strings at a time. In this case, mode b in FIG. 2(b) can be used.

Modes a, b, and c in FIGS. 2(a), 2(b), and 2(c), respectively, just visualize only the sound timing for picking strings. Accordingly, it may be preferable to control just one timing indicator instead of the illuminating LED-equipped fret switch 6 and the open string notification LED 4. Alternatively, it may be preferable to control six notification LEDs which also specify the plucking member 8 to be picked.

When at least one illuminating LED-equipped fret switch 6 turns on in mode d of FIG. 2(d), one left-hand finger is used (single-finger) to press at least one illuminating LED-equipped fret switch 6 which indicates a fretting operation by means of the illumination. In addition, the right hand is used to pick any plucking member 8 (single-trigger). This operation sounds all tones indicated by the illuminating LED-equipped fret switch 6 and the open string notification LED 4. Since any string can be picked, it is possible to pick the sixth string which is not indicated to be picked.

If at least a part of the fretting operation is correct and the picking operation timing is correct, the apparatus sounds all the notes by mechanically performing missing fretting operations and specifying strings to be picked.

Accordingly, there is provided the inventive electronic musical apparatus with assistance for a performance based on music performance data representative of a model music piece composed of a plurality of notes allocated to a plurality of channels, each note being determined in terms of a target pitch and a target timing. In the mode d of the inventive apparatus, the indicator section visually indicates the target timings and the target pitches of at least a part of the notes in correspondence with the respective channels according to the music performance data to thereby visually prompt a progression of the model music piece. A timing input section composed of the plucking member 8 is operable by a user for inputting a current timing to any one or more of the channels. A pitch input section composed of the fret switch is operable by a user for inputting an actual pitch to a particular channel The detecting section detects a note having a target timing matching the current timing and a target pitch matching the actual pitch in the particular channel. The output section responds to the detecting section for outputting the music performance data to the respective channels for sounding the detected note and other note having the target timing matching the current timing.

The open string notification LED 4 is enabled to indicate the picking of an open string. In this case, picking the plucking member 8 corresponding to the open string is treated as correct operation in the same manner that the illuminating LED-equipped fret switch 6 is pressed as indicated.

There may be the case where a user may simultaneously press a plurality of illuminating LED-equipped fret switches 6 belonging to the same string number (column arrangement). In this case, according to the sounding principle of a guitar, the apparatus validates a press of only the illuminating LED-equipped fret switch 6 nearest to the plucking member, namely assigned with the largest fret number.

In mode d, if a plurality of illuminating LED-equipped fret switches 6 to be pressed correspond to different string numbers, all associated.tones are sounded just by pressing the fret switch with one left-hand finger.

Accordingly, it may be preferable to indicate only the chord root constituting a chord with the illuminating LED-equipped fret switch 6 or the open string notification LED 4.

As an alternative method, the chord root for a chord may be indicated by intensely illuminating or blinking the corresponding LED. The other chord tones may be indicated by dimly illuminating or just steadily lighting the corresponding LEDs. Further, it may be preferable to illuminate the chord root and the other chord tones with different colors by using multicolor LEDs or a combination of LEDs with different illumination colors.

A user uses this mode for practicing an operation to press the illuminating LED-equipped fret switch 6 corresponding to the chord root. In this case, by adding a further condition, it may be preferable to sound all chord tones only when the user presses the illuminating LED-equipped fret switch 6 corresponding to the illuminating chord root.

By adding a still further condition, it may be also preferable to sound all chord tones only when the user picks the plucking member 8 corresponding to the chord root.

In mode e of FIG. 2(e), when at least one illuminating LED-equipped fret switch 6 turns on, each active illuminating LED-equipped fret switch 6 is pressed with one or a plurality of fingers on the left hand like the ordinary performance. (This is called all-finger. However, it does not mean pressing the illuminating LED-equipped fret switches 6 for all strings.) In addition, the right hand is used to pick at least one plucking member 8 (single-trigger) actually indicated by the illuminating LED-equipped fret switch 6 and the open string notification LED 4. This operation sounds a note having a pitch indicated by the illuminating LED-equipped fret switch 6 and the open string notification LED 4.

As shown in the figure, only a part of plucking members 8 may be picked. In this case, when the illuminating LED-equipped fret switch 6 associated with an unpicked string is pressed or corresponds to an open string, the apparatus sounds the tone corresponding to this illuminating LED-equipped fret switch 6 and the open string notification LED 4.

In other words, when the illuminating LED-equipped fret switch 6 is pressed correctly and the picking operation is partly correct, the apparatus mechanically performs the remaining fretting and picking operations for sounding.

Accordingly, there is provided the inventive electronic musical apparatus with assistance for a performance based on music performance data representative of a model music piece composed of a plurality of notes allocated to a plurality of channels, each note being determined in terms of a target pitch and a target timing. In the mode e of the inventive apparatus, the indicator section visually indicates the target pitches and the target timings of the notes in correspondence with at least a part of the channels according to the music performance data to thereby visually prompt a progression of the model music piece. The timing input section is operable by a user for inputting a current timing to a first channel. The pitch input section is operable by a user for inputting an actual pitch to a second channel. The detecting section detects one note having a target timing matching the current timing and a target pitch matching the actual pitch in the second channel, and detects another note having a target timing matching the current timing in the first channel. The output section responds to the detecting section for outputting the music performance data to the respective channels, thereby sounding all of the notes having the target timing matching the current timing and including said one note and said another note.

Alternatively, only when the illuminating LED-equipped fret switch 6 is pressed correctly and the string corresponding to the correctly pressed illuminating LED-equipped fret switch 6 is picked correctly, the apparatus can sound all tones by mechanically performing the remaining fretting operations.

Like mode d in FIG. 2(d), this mode e also sounds all chord tones just by pressing the switch with one left hand finger (single-finger). Accordingly, it may be preferable to indicate only the chord root for the chord by using the illuminating LED-equipped fret switch 6 or the open string notification LED 4. The user can use this mode for practicing an operation of pressing the illuminating LED-equipped fret switch 6 corresponding to the chord root.

In this case, by adding a further condition, it may be preferable to sound all chord tones only when the user presses the illuminating LED-equipped fret switch 6 corresponding to the illuminating chord root. By adding a still further condition, it may be also preferable to sound all chord tones only when the user picks the plucking member 8 corresponding to the chord root. This case matches the case where the most stringent condition is added to FIG. 2(d).

In mode f of FIG. 2(f), when at least one illuminating LED-equipped fret switch 6 is active, one or a plurality of fingers on the left hand is used to press all active illuminating LED-equipped fret switches 6 (all-finger) like the ordinary performance. In addition, the right hand is used to pick the plucking members 8 (all trigger) actually indicated by the illuminating LED-equipped fret switches 6 and the open string notification LEDs 4. This operation sounds notes having pitches indicated by the illuminating LED-equipped fret switches 6 and the open string notification LEDs 4.

As shown in the figure, this operation mode f adds a condition of picking the required plucking members 8 (all-finger). Accordingly, this mode sounds only notes having pitches indicated by the illuminating LED-equipped fret switches 6 or the open string notification LEDs 4 associated with strings which should be picked and are actually picked.

Namely, the apparatus sounds notes without any mechanically assistance in the fretting operation and in specifying a string to be picked.

Accordingly, there is provided the inventive electronic musical apparatus with assistance for a performance based on music performance data representative of a model music piece composed of a plurality of notes allocated to a plurality of channels, each note being determined in terms of a target pitch and a target timing. In the mode f of the inventive apparatus, the indicator section visually indicates the target pitches and the target timings of the notes in correspondence with the channels according to the music performance data to thereby visually prompt a progression of the model music piece. The timing input section is operable by a user for inputting a current timing to a first channel. The pitch input section is operable by a user for inputting an actual pitch to a second channel. The detecting section detects a note having a target timing matching the current timing and a target pitch matching the actual pitch in the second channel, and further detects that the first channel inputted with the current timing is identical to the second channel inputted with the actual pitch. The output section responds to the detecting section for outputting the music performance data to the second channel, thereby sounding the detected note.

The aforementioned description does not cover operations of the illuminating LED-equipped fret switch 6 and the plucking member 8 which are not indicated by the, illuminating LED-equipped fret switch 6 or the open string notification LED 4.

No sound is generated if the user picks a string which is not indicated by the illuminating LED-equipped fret switch 6 and the open string notification LED 4.

In order to call a user's attention, it may be preferable to explicitly generate a sound (if not indicated) by setting a condition for generating a pitch specified by the user's fretting and picking operations.

It is also possible to simply sound a pitch specified by the user's fretting and picking operations. This means the fully manual performance. In this case, it is not always necessary to turn on the illuminating LED-equipped fret switch 6 and the open string notification LED 4.

The aforementioned description has provided examples of the chord accompaniment except FIG. 2(c). A chord comprises three or more notes which are sounded almost simultaneously. Almost all the notes maintain the harmonic relationship.

Namely, in the electronic musical apparatus with assistance for a performance based on music performance data representative of a music piece composed of a plurality of notes being allocated to a plurality of channels and including a set of notes constituting a chord, each note being determined in terms of a target pitch and a target timing, the indicator section visually indicates at least the target timings of the notes in correspondence with the channels according to the music performance data to thereby visually prompt a progression of the music piece. The timing input section is operable by a user for inputting a current timing to a channel. The detecting section detects that the inputted current timing matches a target timing of one of the notes constituting the chord. The output section responds to the detecting section for outputting the music performance data to the respective channels, thereby sounding the notes constituting the chord and having the target timing matching the current timing while suppressing the sounding of other note which is not involved in the chord.

However, it is also possible to apply FIGS. 2(a) to 2 (f) to the melody performance.

It is possible to mix the performance including simultaneously sounded notes (e.g., chord performance) with the performance not including simultaneously sounded notes (e.g., simple melody performance).

The user can freely switch between the aforementioned operation modes by manipulating the mode selection switch 7a in FIG. 1. However, it is not always necessary to provide all the operation modes as shown in the figure. The operation modes may be fixed. Alternatively, it may be preferable to provide at least two operation modes and select one of them.

It may be preferable to automatically determine any of the modes in FIGS. 2(a) to 2(c) by selecting the mode selection switch 7a as the ultra EZ mode and selecting a model song. For this purpose, a performance data file stores mode setting data to be described later with reference to FIG. 3.

Further, it may be preferable to forcibly set a mode independently of the setting of the mode selection switch 7a when a song in the ultra EZ mode is selected.

With respect to all song data, it may be preferable to determine a mode associated with difficulty of the performance in accordance with the song selection. Moreover, modes for all the song data may be independent of the song selection.

FIG. 3 exemplifies an auto-play file which records song data or music performance data to be used for an embodiment of the present invention.

Based on sound event codes and pitch sound timings included in the song data or music performance data, the apparatus controls the aforementioned LED-equipped fret switches 6 and open string notification LEDs 4, assists user's performance operations in each of the aforementioned operation modes, and checks performance operation inputs.

In FIG. 3(a), the reference numeral 21 denotes an auto-play file containing song data equivalent to four songs, for example.

The following describes the song data with song number (1). The reference numeral 21a represents a title of the song number data. The reference numeral 21b denotes mode setup data which is specified with two bits, for example. The reference numeral 21c represents an auto-play chord data area and 21d an auto-play melody data area.

As mentioned above, the mode setup data 21b specifies one of ultra EZ modes in FIGS. 2(a) to 2(c). When mode c of FIG. 2(c) is specified, for example, the auto-play melody data 21d is used. The auto-play chord data 21c is used in the other modes except FIG. 2(c).

The song data contains auto-play chord data and auto-play melody data. However, the song data may contain only play data or performance data used for operation modes specified by the aforementioned mode setup data 21b.

FIG. 3(b) exemplifies an area for auto-play chord data 21c together with its address (ADR1).

The auto-play chord data 21c in the figure is stored in a storage area specified by each address (ADR1) together with a chord name (Chord) as event data and time information A(ADR1). The chord name (Chord) is a combination of a chord root and a chord type.

FIG. 3(c) exemplifies an area for auto-play chord data 21d together with its address (ADR2).

In this example, a pitch name (Melody) is stored as event data in a storage area specified by each address (ADR2) together with time information A(ADR2).

In FIGS. 3(b) and 3(c), time information A(ADR1) and A(ADR2) each specifies the time from the beginning to an event occurrence. In this example, the time information is represented by the number of bars (BAR to be described) and the number of tempo clocks (TCL to be described). There is the relationship of 1 BAR=96 TCLs.

FIG. 4 illustrates a lookup table for converting the chord name or the pitch name in FIG. 3 to a string channel number and a fret number.

The string channel number corresponds to a string number on the guitar. The string number specifies the column arrangement of the illuminating LED-equipped fret switch 6, the open string notification LED 4, and the plucking member 8.

A fret number in FIG. 2 is used for specifying a row of illuminating LED-equipped fret switches 6 and the open string notification LED 4. As mentioned above, fret number 0 specifies the open string notification LED 4.

FIG. 4(a) is a lookup table for referencing a string number and a fret number from the chord name. This conversion rule is already known as a chord book. However, the conversion rule does not necessarily follow the chord book. The conversion rule may be simplified for the use of beginners. There are high chords and low chords. It is recommended to use low chords for beginners.

In the example of FIG. 2, C2 is converted to string number 5 and fret number 3, E2 to string number 4 and fret number 2, G2 to string number 3 and fret number 0, C3 to string number 2 and fret number 1, and E3 to string number 1 and fret number 0.

FIG. 4(b) is a lookup table for referencing a string number and a fret number from the pitch.

The auto-play file 21 in FIG. 3 stores chord data and melody data separately.

As another data storage format, a MIDI (Musical Instrument Digital Interface) file can include chord data and melody data.

As the first storage format, chord tones are stored as separate note on data. The chord tones' sound timings are stored with a slightly shifted tempo clock between them so that these sound timings occur substantially at the same time. In order to extract only chord tones for the chord performance, it is just necessary to assign a specific MIDI channel exclusively for chords.

As the second storage format, MIDI channels are allocated for the number of strings. Different MIDI channels are used to sound notes for each string. This method enables to assign slightly different timbres or apply different sound processing to each channel.

A model may be song data comprising a mixture of a melody and a chord. In this case, the user concurrently plays the chord and the melody with free fingers.

Figure 5:
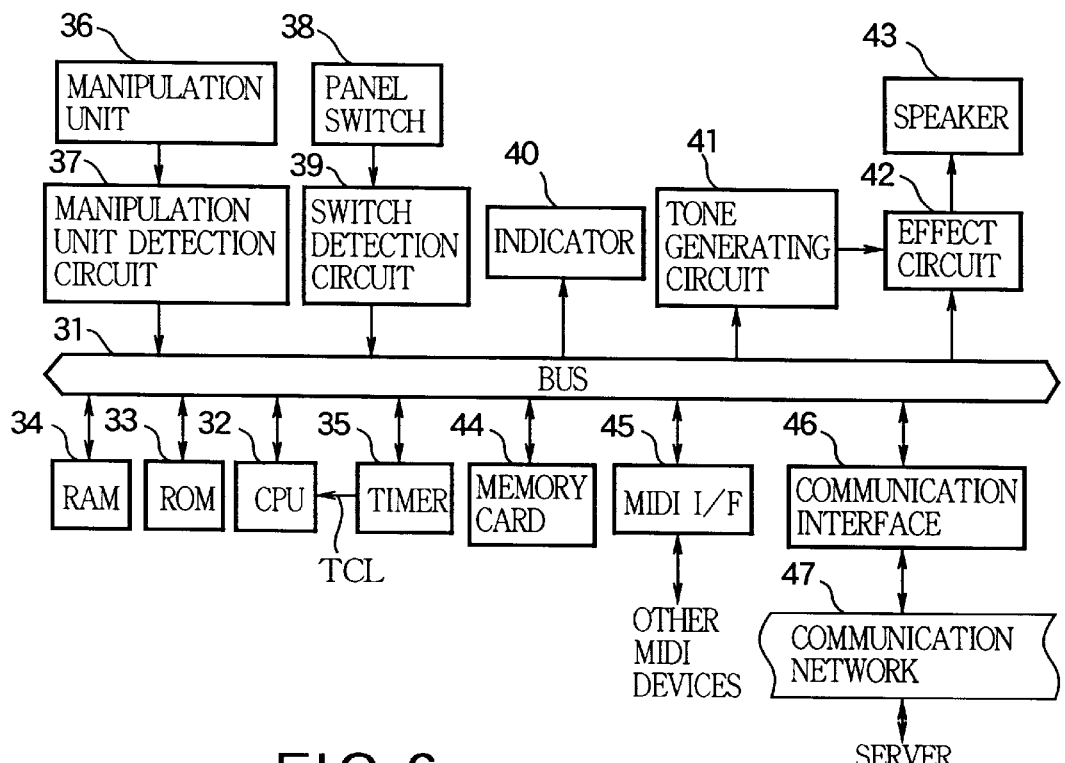
FIG. 5 is a block diagram exemplifying the hardware configuration for implementing an embodiment of the present invention.

FIG. 5 is a block diagram exemplifying the hardware configuration for implementing an embodiment of the present invention.

In the figure, the reference numeral represents a bus, 32 a CPU, 33 ROM (Read Only Memory), and 34 RAM (Random Access Memory). The reference numeral denotes a timer for counting interrupt times, various time intervals, and the time.

The reference numeral represents a manipulation unit and 37 a manipulation unit detection circuit. The manipulation units include switches of the illuminating LED-equipped fret switch 6 and the plucking member 8 as shown in FIG. 1. The reference numeral 38 denotes a panel switch and 39 a switch detection circuit.

A piezo sensor is provided for each plucking member 8. A vibration signal from the piezo sensor is A/D converted and is input to the manipulation unit detection circuit 37. The panel switches 38 include the mode selection switch 7a in FIG. 1 etc. The reference numeral 40 represents an indicator. The indicators 40 include an LED of the illuminating LED-equipped fret switch 6, the open string notification LED 4, and the number display LED 7e.

The reference numeral 41 denotes a tone generating circuit, 42 an effect circuit, and 43 a speaker. Part of ROM 33 stores PCM tone generator waveform data. The tone generating circuit 41 in the figure includes a D/A converter. The reference numeral 44 represents an external storage device such as a memory card etc. and 45 a MIDI interface connected to other MIDI devices.

Song data as a model is read from the ROM 33 or an external storage device such as the memory card 44. In some cases, song data may be MIDI data input from an external electronic musical instrument or a sequencer connected to the MIDI interface 45.

When song data is played through the use of the illuminating LED-equipped fret switch 6 and the plucking member 8, the song data is output as MIDI data via the MIDI interface 45 and is reproduced or stored on an external MIDI device.

The reference numeral 46 denotes a communication interface. The communication interface 46 is used for connection to servers on the Internet via a communication network 47 such as a subscriber telephone line, etc. or to servers via LANs, etc. In this manner, the communication interface 46 allows song data as a model to be input (streaming reproduction or download) or played song data to be output to the communication network 47.

The CPU 32 loads a program stored in the ROM 33 to the RAM 34 for general input/output control. The CPU 32 is also performs processing for implementing the present invention. The program for implementing the present invention can be supplied from the memory card 44. It is also possible to download such program together with various data from servers by connecting to the communication network 47 via the communication interface 46.

The tone generating circuit 41 creates a tone signal according to performance data supplied via a path 31. The tone signal is converted to an analog waveform in the D/A converter, is provided with various effects such as reverb in the effect circuit 42, and then is output from a speaker 43.

While the aforementioned description provides the internal tone generating circuit 41, it may be preferable to use an external tone generating circuit. Namely, performance data such as MIDI data may be output externally via the MIDI interface 45 or the communication interface 46.

As described with reference to FIG. 2, the embodiment of the present invention sets string channels corresponding to string numbers. For each channel, the embodiment provides control to activate the illuminating LED-equipped fret switch 6 and the open string notification LED 4. Further, for each channel, the embodiment detects operations of the illuminating LED-equipped fret switch 6 and the plucking member 8.

Accordingly, the tone generating circuit 41 can provide independent sound processing for each string channel by using the string channel as a sound channel. Namely, it is possible to provide each channel with a slightly differing timbre. It is also possible to slightly shift a pitch or sound timing for each channel. Alternatively, the sound processing is available by mixing down data for the respective string channels corresponding to the string numbers to a single sound channel.

The following outlines operations for the embodiment of the present invention implemented by the CPU 32 in FIG. 5 with reference to FIGS. 6 to 13.

Figure 6:
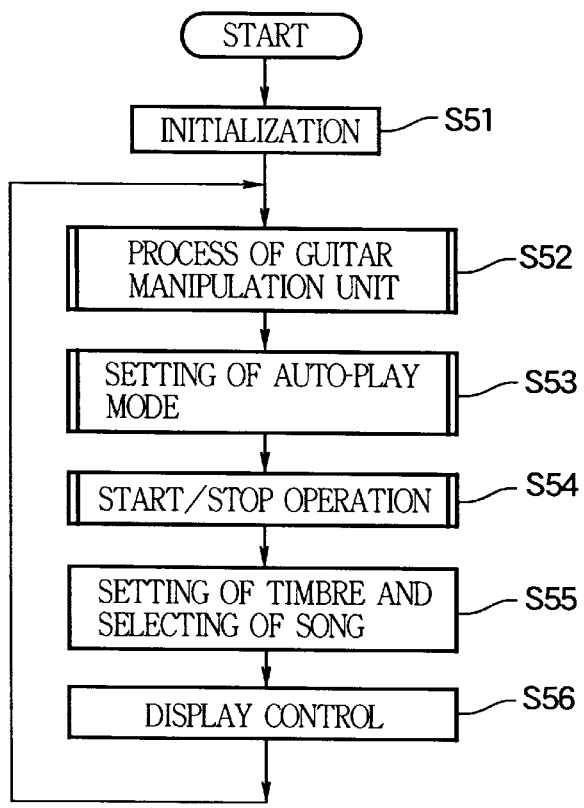
FIG. 6 is a flowchart of the main routine.

FIG. 6 is a flowchart of the main routine. The sound processing is omitted because it is performed in the tone generating circuit 41.

The main routine is initialized at step S51. For example, an operation mode is set to the ultra EZ mode and a timbre is set to the classical guitar. The other parameters are initialized. For example, variable run to be described is reset to 0.

At step S52, the guitar based manipulation unit is processed. Namely, sound indication data for a note is created according to the operation mode described with reference to FIG. 2.

At step S53, the operation mode is set for auto-play. At step S54, a start/stop operation is performed. This start/stop operation starts or stops reading song data as a model according to a toggle operation of the start/stop switch 7c in FIG. 1.

At step S55, the process sets a timbre and selects a song.

At step S56, display control is provided for the indicator 40 in FIG. 5 and control returns to step S52. The process at step S56 includes display control of an LED of the illuminating LED-equipped fret switch 6 and the open string notification LED 4.

Figure 7:
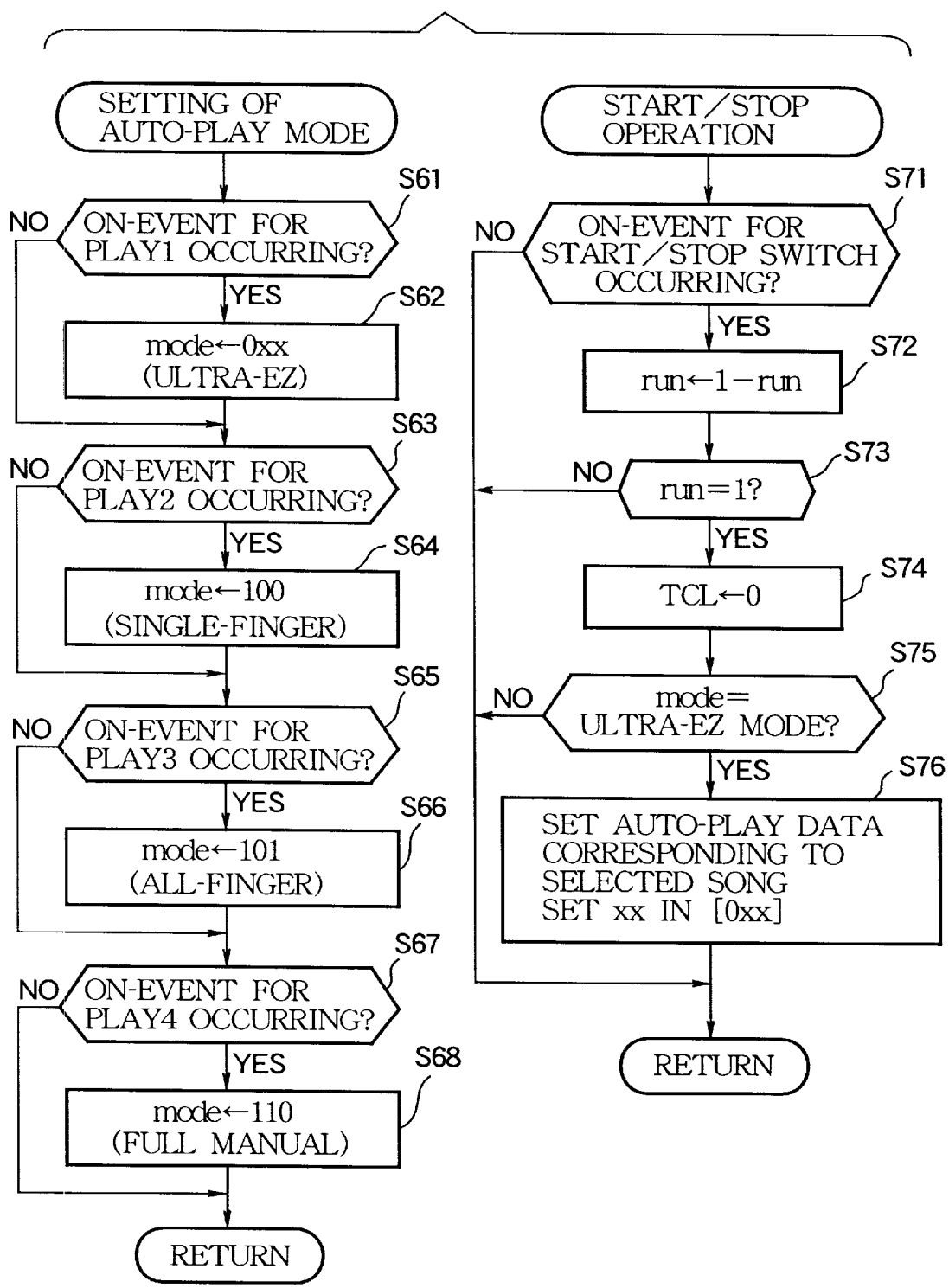
FIG. 7 is a flowchart detailing the auto play mode setting and start/stop processing.

FIG. 7 is a flowchart detailing the auto-play mode setting at step S53 and start/stop processing at step S54.

The auto-play mode setting is explained first.

At step S61, it is determined whether an on event occurs for a PLAY1 button, one of mode selection switches 7a in FIG. 1. If no on event occurs, control proceeds to step S63. If this on event occurs, control proceeds to step S62 to enable the ultra EZ mode. The ultra EZ mode zeroizes the most significant bit of the mode specification data.

At step S63, it is determined whether an on event occurs for a PLAY2 button. If no on event occurs, control proceeds to step S65. If this on event occurs, control proceeds to step S64 to enable the single-finger mode and set the mode specification data to 100. Control then proceeds to step S67.

At step S65, it is determined whether an on event occurs for a PLAY3 button. If no on event occurs, control proceeds to step S67. If this on event occurs, control proceeds to step S66 to enable the all-finger mode and set the mode specification data to 101. Control then proceeds to step S67.

At step S67, it is determined whether an on event occurs for a PLAY4 button. If no on event occurs, control returns to the main routine in FIG. 6. If this on event occurs, control proceeds to step S68 to enable the fully manual mode and set the mode specification data to 110. Control then returns to the main routine.

Then, the start/stop operation is described below.

At step S71, it is determined whether an on event occurs for the start/stop switch 7c in FIG. 1. If this on-event occurs, control proceeds to step S62. If no on event occurs, control returns to the main routine in FIG. 6.

At step S72, a value for variable run is subtracted from 1. The result is set as a new run value. Control then proceeds to step S73. This variable run is initialized to 0 at step S51 of the main routine in FIG. 6.

At step S73, it is determined whether run=1. If run=1, control proceeds to step S74. Otherwise, control returns to the main routine. When variable run is set to 1, this means that the auto-play starts. When variable run is reset to 0, this means that the auto-play stops.

At step S74, tempo clock TCL is initialized to 0 and control proceeds to step S75. This tempo clock TCL indicates the lapse of time from the start of the auto-play.

At step S75, it is determined whether the ultra EZ mode is enabled. If the ultra EZ mode is enabled, control proceeds to step S76. Otherwise, control returns to the main routine. At step S76, the 2-bit mode setup data 21b is set to xx in the mode specification data [0xx]. The mode setup data 21b is included in song data selected from the auto-play file 21 in FIG. 3.

There may be cases where no song data is selected, or the song data contains no mode setup data 21b or contains undefined mode setup data (00). In these cases, value xx is assumed to be default 01 and control proceeds to step S63.

In the aforementioned description, the operation mode is finally determined at startup. However, it may be preferable to determine the operation mode when the auto-play mode is set.

FIGS. 8 to 11 are flowcharts for detailing the process at step S52 for the guitar based manipulation unit in FIG. 6.

Step S52 for the guitar based manipulation unit executes different processes according to auto-play operation modes. Namely, the process uses a value of the mode specification data determined during the auto-play mode setting in FIG. 7. Based on this condition, control proceeds to a step common to the respective operation modes for a common process. Alternatively, control branches to different steps according to the respective operation modes for different processes. This will complicate the explanation.

Hence, the following describes respective modes independently. It is noted that three ultra EZ modes are represented with one flowchart.

That is, when control proceeds to step S52 for the guitar based manipulation unit in the main routine of FIG. 6, a value of the mode specification data causes a branch to any of the flowcharts in FIGS. 8 to 11. Upon completion of the processes for the flowcharts in FIGS. 8 to 11, control returns to the main routine in FIG. 6 anyway.

Figure 8:
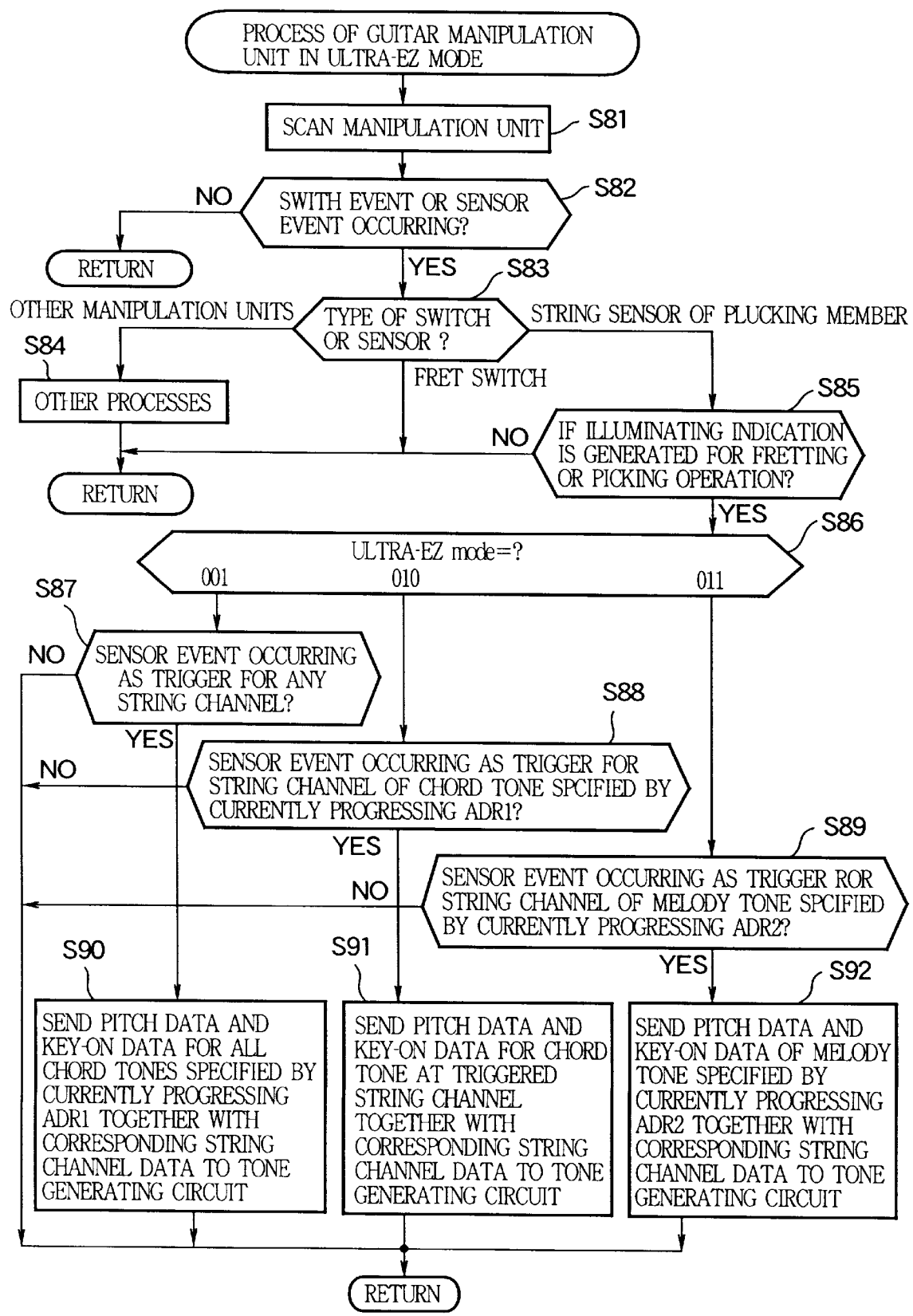
FIG. 8 is a flowchart showing operations in the ultra-EZ mode.

FIG. 8 is a flowchart showing operations in the ultra EZ mode. The mode specification data is 001, 010, or 011. These values correspond to modes a, b, and c in FIG. 2.

Figure 9:
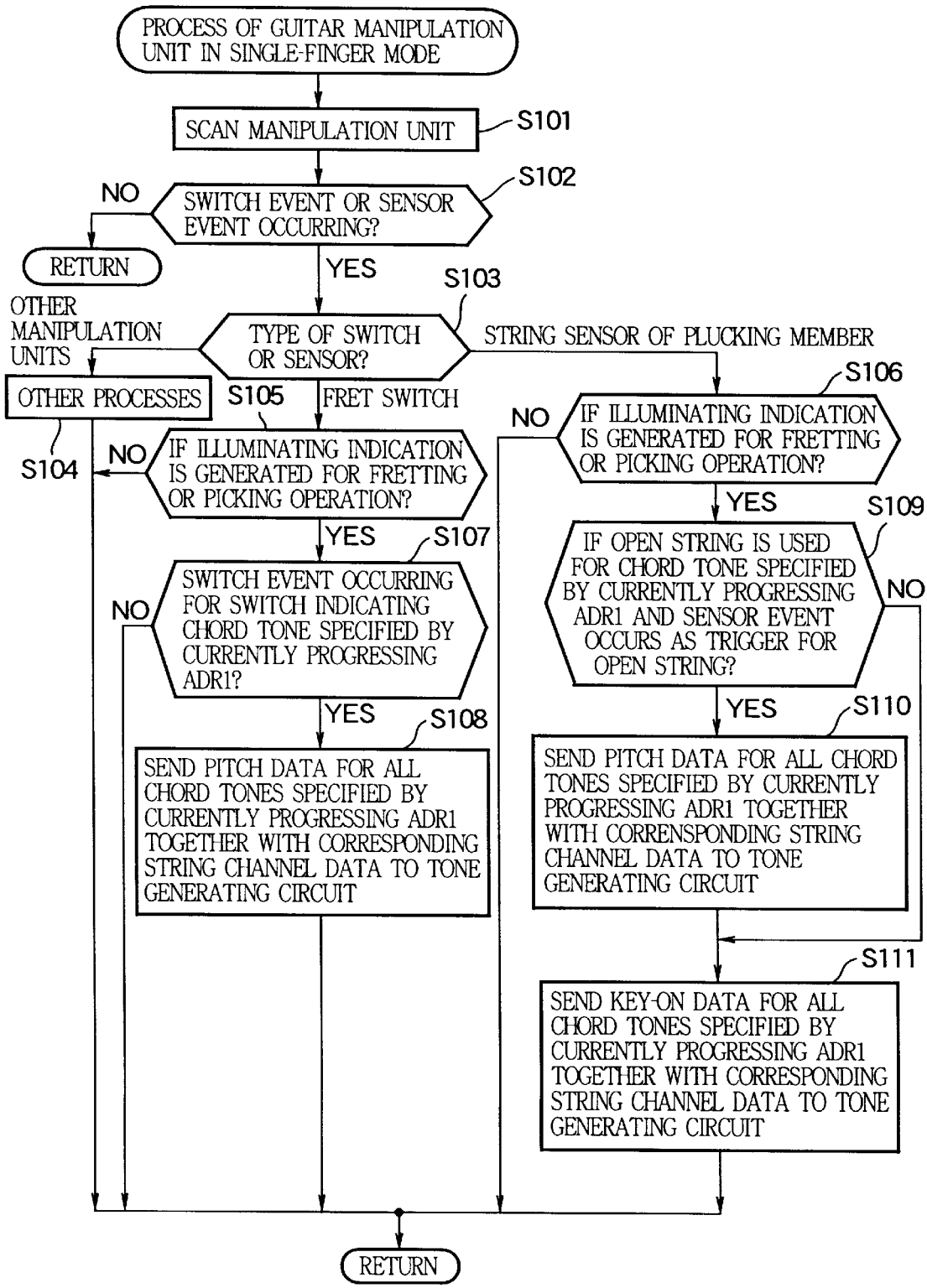
FIG. 9 is a flowchart showing operations in the single-finger mode.

FIG. 9 is a flowchart showing operations in the single-finger mode. The mode specification data is 100. This value corresponds to mode d in FIG. 2.

Figure 10:
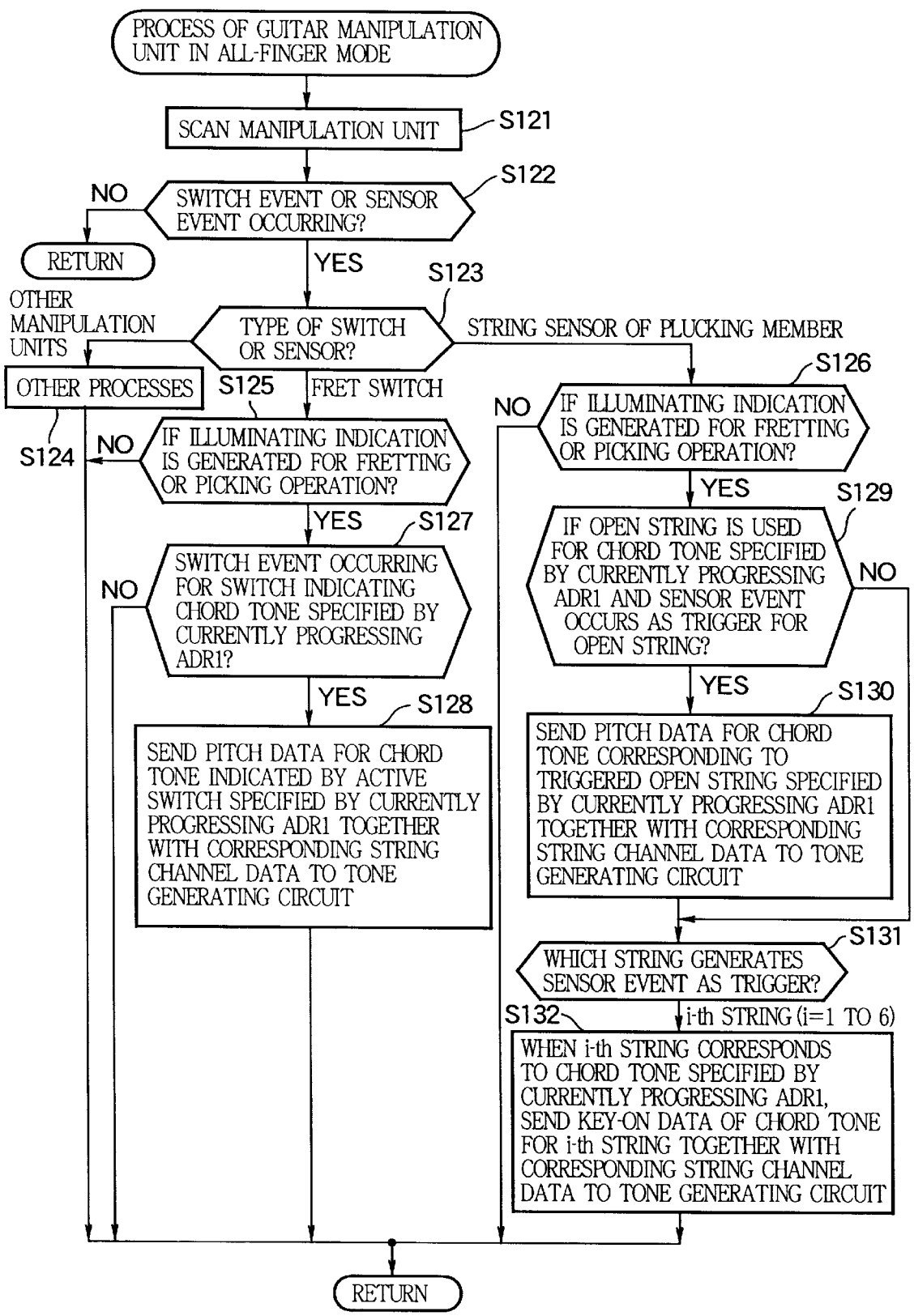
FIG. 10 is a flowchart showing operations in the all-finger mode.

FIG. 10 is a flowchart showing operations in the all-finger mode. The mode specification data is 101. This value corresponds to mode f in FIG. 2.

Figure 11:
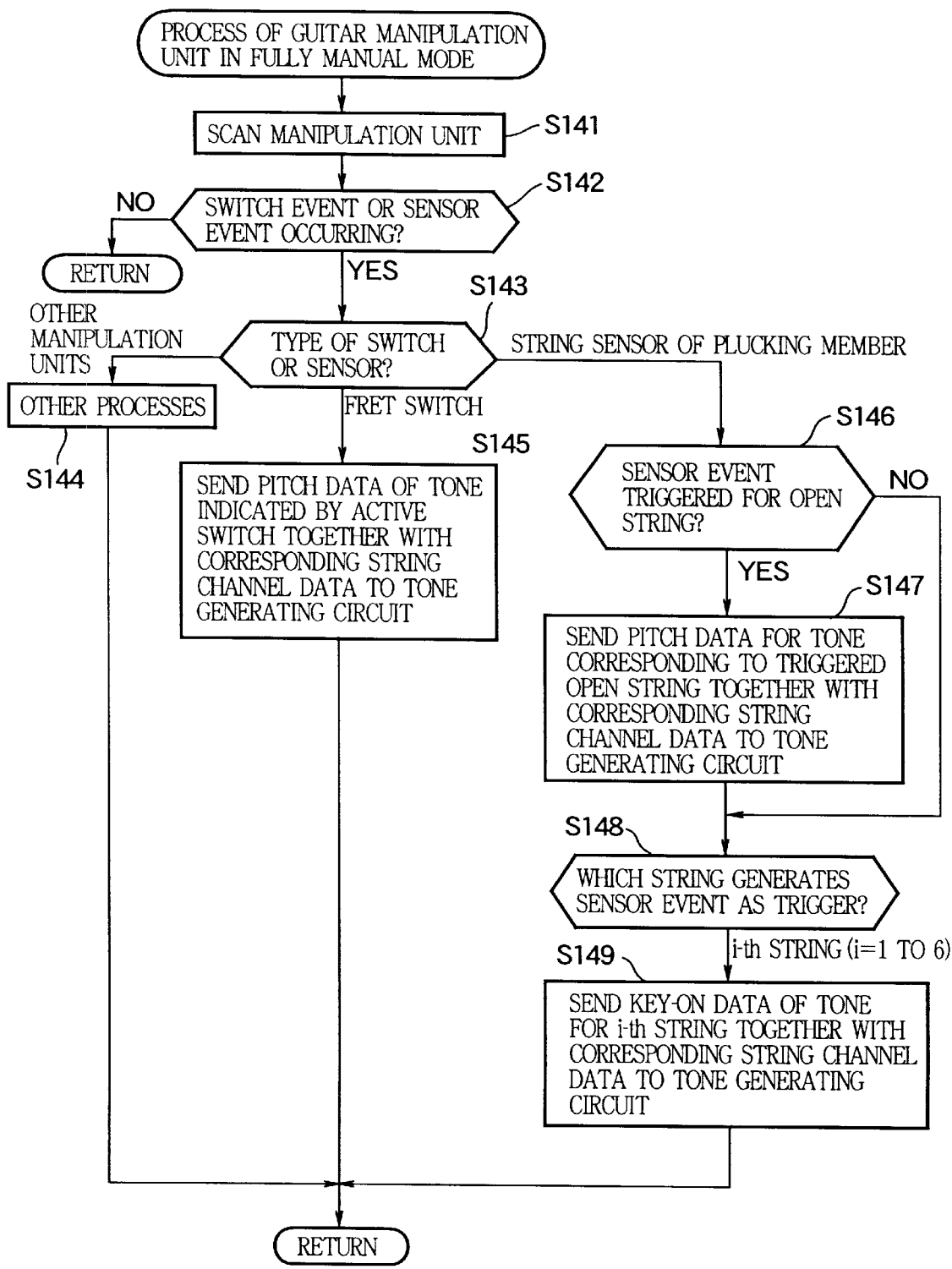
FIG. 11 is a flowchart detailing the process of the guitar based manipulation unit.

FIG. 11 is a flowchart showing operations in the fully manual mode. The mode specification data is 110.

The aforementioned description has specified a fret number for each string channel. The following flowcharts use pitch data instead of the fret number for each string channel. Both function as parameters for specifying note pitches corresponding to the respective string channels.

First, operations in the ultra EZ mode are described.

At step S81 in FIG. 8, the process scans an event occurrence state for the guitar based manipulation unit.

At step S82, it is determined whether an event occurs (event occurrence and event on state in process) on a string sensor for the illuminating LED-equipped fret switch 6 or the plucking member 8. A single event occurrence is detected at an interval of 200 to 300 ms, for example. When no event occurs, control returns to the main routine in FIG. 6. When an event occurs, control proceeds to step S83.

At step S83, when an event occurs on the illuminating LED-equipped fret switch 6, control returns to the main routine. When an event occurs on the string sensor for the plucking member 8, control proceeds to step S85. When an event occurs on another guitar based manipulation unit, if any, control proceeds to step S84 for performing the other processing, and then returns to the main routine.

At step S85, it is determined whether the illuminating LED-equipped fret switch 6 and the open string notification LED 4 provide an illuminating indication for pressing any of the illuminating LED-equipped fret switches 6, and/or picking any of the plucking members 8. If the illuminating indication is provided, control proceeds to step S86. If not, control returns to the main routine. This illuminating indication is based on auto-play data specified by a currently progressing address. In the ultra EZ mode, subordinate operation modes allow different auto-play data to be read. The address is accordingly set to ADR1 or ADR2 in FIG. 3.

At step S86, any of the subordinate operation modes is determined. When mode specification data is 001, control proceeds to step S87. When mode specification data is 010, control proceeds to step S88. When mode specification data is 011, control proceeds to step S89.

When mode a in FIG. 2(a) is enabled, control proceeds to step S87. It is determined whether a sensor event for the detected plucking member 8 is trigger for any of the string channels. If this is true, control proceeds to step S90. If not, control returns to the main routine.

At step S90, the process sends pitch data and key-on data for all chord tones in the auto-play chord data (APC) specified by the currently progressing address (ADR1) together with the corresponding string channel data to the tone generating circuit and returns to the main routine.

When a plurality of plucking members 8 is picked at the correct timing, the same pitch data and key-on data are sent to the tone generating circuit substantially at the same timing. However, this operation is assumed to be a single sound indication for sound processing. When the sound indication is output externally, single note on data is created.

When mode b in FIG. 2(b) is enabled, control proceeds to step S88. It is determined whether the sensor event is trigger for a string channel of any chord tone in the auto-play chord data (APC) specified by the currently progressing address (ADR1). If this is true, control proceeds to step S91. If not, control returns to the main routine.

At step S91, the process sends pitch data and key-on data for the chord tone at the triggered string channel together with the corresponding string channel data to the tone generating circuit and returns to the main routine.

When mode c in FIG. 2(c) is enabled, control proceeds to step S89. It is determined whether the sensor event is trigger for the string channel of a melody tone in the auto-play melody data (APM) specified by the currently progressing address (ADR2). If this is true, control proceeds to step S91. If not, control returns to the main routine.

At step S92, the process sends pitch data and key-on data of a melody tone in the auto-play melody data (APM) specified by the currently progressing address (ADR2) together with the corresponding string channel data to the tone generating circuit.

The following describes operations in the single-finger mode.

At step S101 in FIG. 9, the process scans an event occurrence state for the guitar based manipulation unit.

At step S102, it is determined whether an event occurs on a string sensor for the illuminating LED-equipped fret switch 6 or the plucking member 8. When no event occurs, control returns to the main routine in FIG. 6. When an event occurs, control proceeds to step S103.

At step S103, when an event occurs on the illuminating LED-equipped fret switch 6, control proceeds to step S105. When an event occurs on the string sensor for the plucking member 8, control proceeds to step S106. When an event occurs on another guitar based manipulation unit, if any, control proceeds to step S104 for performing the other processing, and then returns to the main routine.

At step S105, it is determined whether an illuminating indication is provided for pressing any of the illuminating LED-equipped fret switches 6 and/or picking any of the plucking members 8. If the illuminating indication is provided, control proceeds to step S107. If not, control returns to the main routine. This illuminating indication is based on auto-play chord data (APC) specified by the currently progressing address (ADR1).

At step S107, it is determined whether the detected switch event is a switch specifying any chord tone in the auto-play chord data (APC) specified by the currently progressing address (ADR1). If this is true, control proceeds to step S108. If not, control returns to the main routine.

At step S108, the process sends pitch data for all chord tones in the auto-play chord data (APC) specified by the currently progressing address (ADR1) together with the corresponding string channel data to the tone generating circuit and returns to the main routine.

Step 106 takes effect when an event is detected on the string sensor for the plucking member 8. At step S106, like step S105, it is determined whether an illuminating indication is provided for the fretting and/or picking operation. If the illuminating indication is provided, control proceeds to step S109. If not, control returns to the main routine. This illuminating indication is based on auto-play chord data (APC) specified by the currently progressing address (ADR1).

At step S109, it is determined whether an open string is used for any of chord tones in the auto-play chord data (APC) specified by the currently progressing address (ADR1) and an event on the string sensor for the detected plucking member 8 is trigger for this open string. If this is true, control proceeds to step S110. If not, control proceeds to step S111.

At step S110, the process sends pitch data for all chord tones in the auto-play chord data (APC) specified by the currently progressing address (ADR1) together with the corresponding string channel data to the tone generating circuit.

At step S111, the process sends key-on data for all chord tones in the auto-play chord data (APC) specified by the currently progressing address (ADR1) together with the corresponding string channel data to the tone generating circuit.

In this flowchart, when pressing a plurality of illuminating LED-equipped fret switches 6 with different string numbers generates correct chord tones, a plurality of same pitch data is sent to the tone generating circuit substantially at the same timing. When a plurality of plucking members 8 is picked at the correct timing, the same key-on data is sent to the tone generating circuit substantially at the same timing. However, this operation is assumed to be a single sound indication for sound processing. When the sound indication is output externally, single note-on data is created.

The following describes operations in the all-finger mode.

At step S121 in FIG. 10, the process scans an event occurrence state for the guitar based manipulation unit.

At step S122, it is determined whether an event occurs on a string sensor for the illuminating LED-equipped fret switch 6 or the plucking member 8. When no event occurs, control returns to the main routine in FIG. 6. When an event occurs, control proceeds to step S123.

At step S123, when an event occurs on the illuminating LED-equipped fret switch 6, control proceeds to step S125. When an event occurs on the string sensor for the plucking member 8, control proceeds to step S126. When an event occurs on another guitar based manipulation unit, if any, control proceeds to step S124 for performing the other processing, and then returns to the main routine.

At step S125, it is determined whether an illuminating indication is provided for pressing any of the illuminating LED-equipped fret switches 6 and/or picking any of the plucking members 8. If the illuminating indication is provided, control proceeds to step S127. If not, control returns to the main routine. This illuminating indication is based on auto-play chord data (APC) specified by the currently progressing address (ADR1).

At step S127, it is determined whether the detected switch event is a switch specifying any chord tone in the auto-play chord data (APC) specified by the currently. progressing address (ADR1). If this is true, control proceeds to step S128. If not, control returns to the main routine.

At step S128, the process sends pitch data for a chord tone indicated by the active switch in the auto-play chord data (APC) specified by the currently progressing address (ADR1) together with the corresponding string channel data to the tone generating circuit and returns to the main routine.

Step 126 takes effect when an event is detected on the string sensor for the plucking member 8. At step S126, like step S125, it is determined whether an illuminating indication is provided for the fretting and/or picking operation. If the illuminating indication is provided, control proceeds to step S129. If not, control returns to the main routine. This illuminating indication is based on auto-play chord data (APC) specified by the currently progressing address (ADR1).

At step S129, it is determined whether an open string is used for any of chord tones in the auto-play chord data (APC) specified by the currently progressing address (ADR1) and an event on the string sensor for the detected plucking member 8 is trigger for this open string. If this is true, control proceeds to step S130. If not, control proceeds to step S131.

At step S130, the process sends pitch data for a chord tone corresponding to the triggered open string in the auto-play chord data (APC) specified by the currently progressing address (ADR1) together with the corresponding string channel data to the tone generating circuit and proceeds to step S131.

At step S131, the process determines a string which triggered the event on the string sensor for the detected plucking member 8. Assuming that the ith string triggered the event, the process proceeds to step S132.

At step S132, when the ith string corresponds to a chord tone in the auto-play chord data (APC) specified by the currently progressing address (ADR1), the process sends key-on data of the chord tone for this ith string together with the corresponding string channel data to the tone generating circuit.

The pitch data is transmitted to the tone generating circuit at step S128 or S130 for each string channel. The tone generating circuit sounds a note whose key-on data is transmitted at step S132.

The following describes operations in the fully manual mode.

At step S141 in FIG. 11, the process scans an event occurrence state for the guitar based manipulation unit.

At step S142, it is determined whether an event occurs on a string sensor for the illuminating LED-equipped fret switch 6 or the plucking member 8. When no event occurs, control returns to the main routine in FIG. 6. When an event occurs, control proceeds to step S143.

At step S143, when an event occurs on the illuminating LED-equipped fret switch 6, control proceeds to step S145. When an event occurs on the string sensor for the plucking member 8, control proceeds to step S146. When an event occurs on another guitar based manipulation unit, if any, control proceeds to step S144 for performing the other processing, and then returns to the main routine.

At step S145, the process sends pitch data of the tone indicated by the active switch together with the corresponding string channel data to the tone generating circuit and returns to the main routine.

Step 146 takes effect when an event is detected on the string sensor for the plucking member 8. At step S146, it is determined whether the sensor event is trigger for the open string. If this is true, control proceeds to step S147. If not, control proceeds to step S148.

At step S147, the process sends pitch data for a tone corresponding to the triggered open string together with the corresponding string channel data to the tone generating circuit and proceeds to step S148.

At step S148, the process determines a string which triggered the event on the string sensor for the detected plucking member 8. Assuming that the ith string triggered the event, the process proceeds to step S149.

At step S149, the process sends key-on data of the tone for this ith string together with the corresponding string channel data to the tone generating circuit.

The pitch data is transmitted to the tone generating circuit at step S145 or S147 for each string channel. The tone generating circuit sounds a note whose key-on data is transmitted at step S149.

Here, reference is made to the flowchart for implementing mode e in FIG. 2(e).

Mode e is intermediate between mode d in FIG. 2(d) and mode f in FIG. 2(f). Accordingly, mode e can be implemented by performing step S111 for sending key-on data in the flowchart of FIG. 9 after step S131 in FIG. 10 with the condition in step S132.

Namely, suppose that the sensor event is trigger from the ith string and the ith string corresponds to any of the chord tones specified by the currently progressing ADR1. In this case, key-on data for all chord tones specified by the currently progressing ADR1 is sent to the tone generating circuit together with the corresponding string channel data.

In order to sound a note for a given string channel in FIGS. 9 to 11, pitch data for this note needs to be sent to the tone generating circuit. In addition, it is required to send key-on data as sound timing information for this note. For this purpose, synchronization processing is performed.

In the tone generating circuit, for example, pitch data is input to the buffer register for each channel. After the pitch data arrives and the pitch is allocated, key-on data is awaited. When the pitch data and key-on data are output externally, this synchronization processing is performed to generate MIDI note on data for output.

In FIGS. 8 to 11, the flowcharts have been described with relation to illuminating indications. Namely, it is first determined whether there is an illuminating indication for the fretting and/or picking operation, and then respective processing is performed. However, the illuminating indication is associated with subsequent decisions since the illuminating indication is controlled by chord tones or melody tones specified by a currently progressing address. Accordingly, it is possible to combine a decision (e.g., step S85 in FIG. 8) to determine whether an illuminating indication is given for the picking operation with the subsequent decisions (e.g., steps S87, S89, and S90 in FIG. 8).

As mentioned above, some of the various modes in FIGS. 8 to 11 may sound all chord tones by picking only one string. For example, mode d in FIG. 2(d) sounds all chord tones just by picking the six string.

Strictly speaking, when a plurality of strings is arpeggiated in this mode, the chord tones are sounded for a plurality of times at a short timing of the arpeggio.

Suppose the processing which assumes short successive sounds after a long non sound (non-trigger) to be a single sound. When this processing is performed before the sound processing, it is possible to process the aforementioned arpeggiated input as a single sound like the one-trigger input or a single string.

When the aforementioned processing is not performed, it is possible to provided an effect similar to the "rasgueado" technique for sounding guitar strings with a plurality of fingers.

During the guitar performance, a string stops vibrating when the string is touched with a hand just after the picking operation. This state can be implemented by modifying the aforementioned flowchart. Thus, as an event of the string sensor for the plucking member 8, it is necessary to detect not only trigger operation, but also the state of a string touched by the user just after the trigger operation.

Before control returns as the result of "no" at steps S87, S89, and S90 in FIG. 8, for example, a key-off signal is sent to the tone generating circuit based on event occurrence, namely the state of a string touched by the user just after the trigger operation. Issuing the key-off signal attenuates a currently generated tone signal in the tone generating circuit.

Before executing the step S111 in FIG. 9, the step S131 in FIG. 10, or the step S148 in FIG. 11, a currently generated tone signal is attenuated in the tone generating circuit based on event occurrence, namely the state of a string touched by the user just after the trigger operation.

The following describes a timer interrupt.

Figure 12:
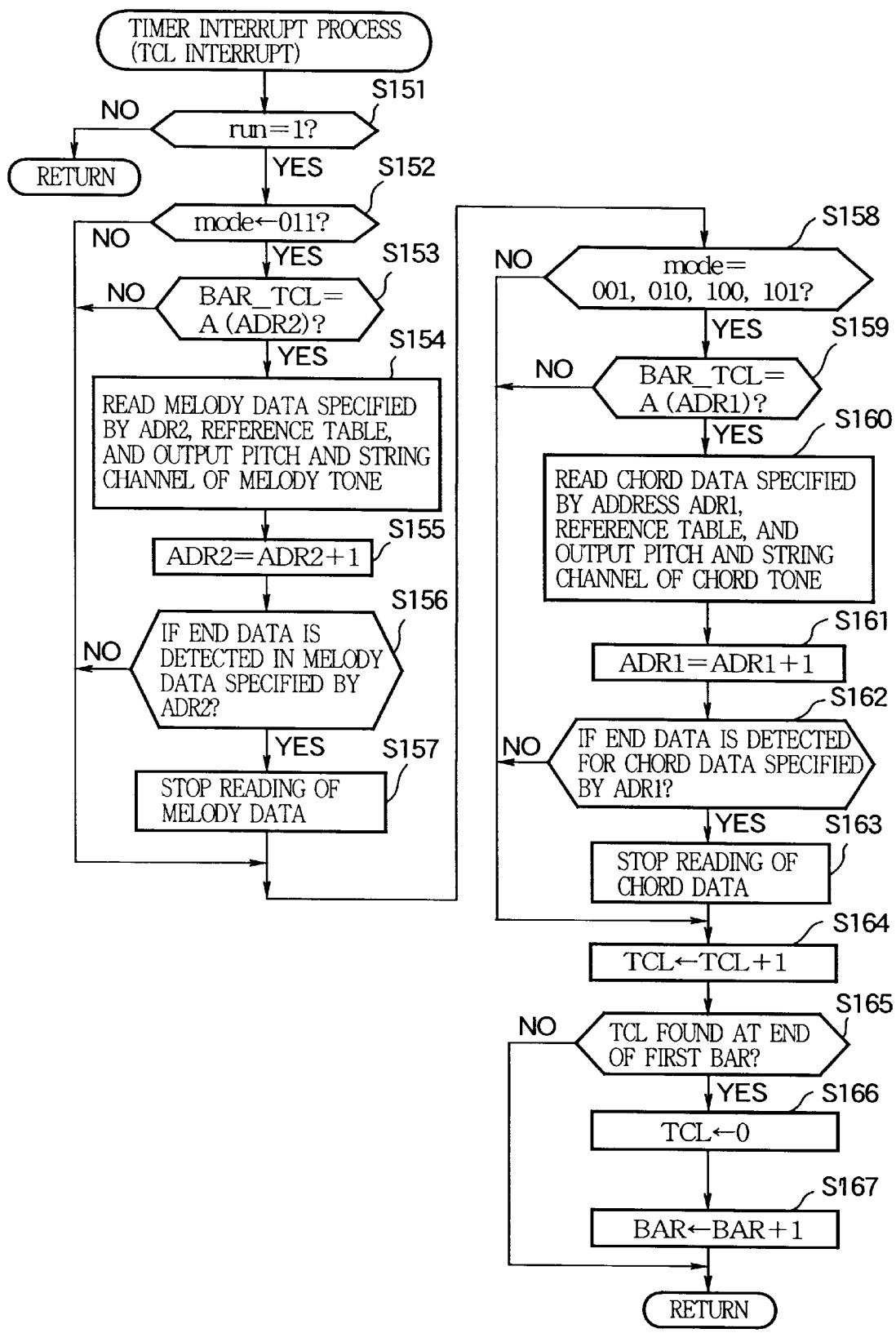
FIG. 12 is a flowchart explaining a timer interrupt process used for reading model song data from the auto-play file.

FIG. 12 is a flowchart explaining a timer interrupt used for reading model song data from the auto-play file 21 in FIG. 3.

At step S151, it is determined whether variable run is set to 1. If the variable is set to 1, control proceeds to step S152. If not, the interrupt process terminates. Variable run is set to 1 when the auto-play starts during start/stop processing in FIG. 7. Variable run is reset to 0 when the auto-play stops.

At step S152, it is determined whether the operation mode is 011, namely mode c in FIG. 2(c). If this mode is enabled, control proceeds to step S153. If not, control proceeds to step S158.

At step S153, it is determined whether the time BAR__TCL (represented with a bar and a tempo clock) is equal to the time information A(ADR2) stored at address ADR2 shown in FIG. 3(b). If BAR__TCL is equal to A(ADR2), control proceeds to step S154. If not, control proceeds to step S158.

At step S154, the process reads the auto-play melody data (APM) specified by address ADR2, references the lookup table in FIG. 4(b), outputs the pitch and the string channel, and then proceeds to step S155.

At step S155, address ADR2 is incremented by one. Control then proceeds to step S156. At step S156, it is determined whether the auto-play melody data (APM) stored at address ADR2 is the END data. When the APM is the END data, the process proceeds to step S157, stops reading the APM, then proceeds to step S158. When the APM is not the END data, the process just proceeds to step S158.

At step S158, it is determined whether the operation mode corresponds to mode specification data 001, 010, 100, or 101. If this is true, the process proceeds to step S159. If not, the process proceeds to step S164.

The operation mode for each of the aforementioned mode specification data uses auto-play chord data (APC) as a model. At step S159, it is determined whether the time BAR_TCL (represented with a bar and a tempo clock) is equal to the time information A(ADR1) specified by address ADR1 shown in FIG. 3(c). If BAR_TCL is equal to A(ADR1), control proceeds to step S160. If not, control proceeds to step S164.

At step S160, the process reads the auto-play chord data (APC) specified by address ADR1, references the lookup table in FIG. 4(a), outputs the pitch and the string channel of the chord tone, and then proceeds to step S161.

At step S161, address ADR1 is incremented by one. Control then proceeds to step S162.

At step S162, it is determined whether the auto-play chord data (APC) specified by address ADR1 is the END data. When the APC is the END data, the process proceeds to step S163, stops reading the APC, then proceeds to step S164. When the APM is not the END data, the process just proceeds to step S158.

At step S164, tempo clock TCL is incremented by one. Control then proceeds to step S165.

At step S165, it is determined whether the tempo clock TCL reaches the end of the first bar. For example, 96 tempo clocks constitute one bar. If the end of the first bar is reached, the process proceeds to step S166. If not, the interrupt process terminates.

At step S166, the tempo clock TCL is reset to 0. At step S167, BAR is incremented by one to terminate the interrupt process.

There have been described principal operations of the embodiment according to the present invention.

As is apparent from the aforementioned description, the auto-play as a model progresses chronologically by keeping the timing. During the auto-play, a song progresses independently of whether the chord or melody played by the user matches or differs from the model.

In the single-finger mode in FIG. 2(*d*), for example, if the illuminating LED-equipped fret switch 6 to be pressed is not pressed with a single finger, chord tones for the gate time are silenced. This is because the tone sounded at the previous timing is attenuated and is not sounded just by a string trigger.

When all illuminating LED-equipped fret switches 6 to be pressed are incorrect or unpressed, no chord tones for the auto-play are generated. As a result, if the user attempts to participate in the performance by adding a chord tone, it is difficult to catch the correct timing.

In order to solve such a problem, a timer interrupt is used to perform an auto-rhythm so that a rhythm tone is automatically generated in the event of a silenced chord tone or melody tone.

Figure 13:
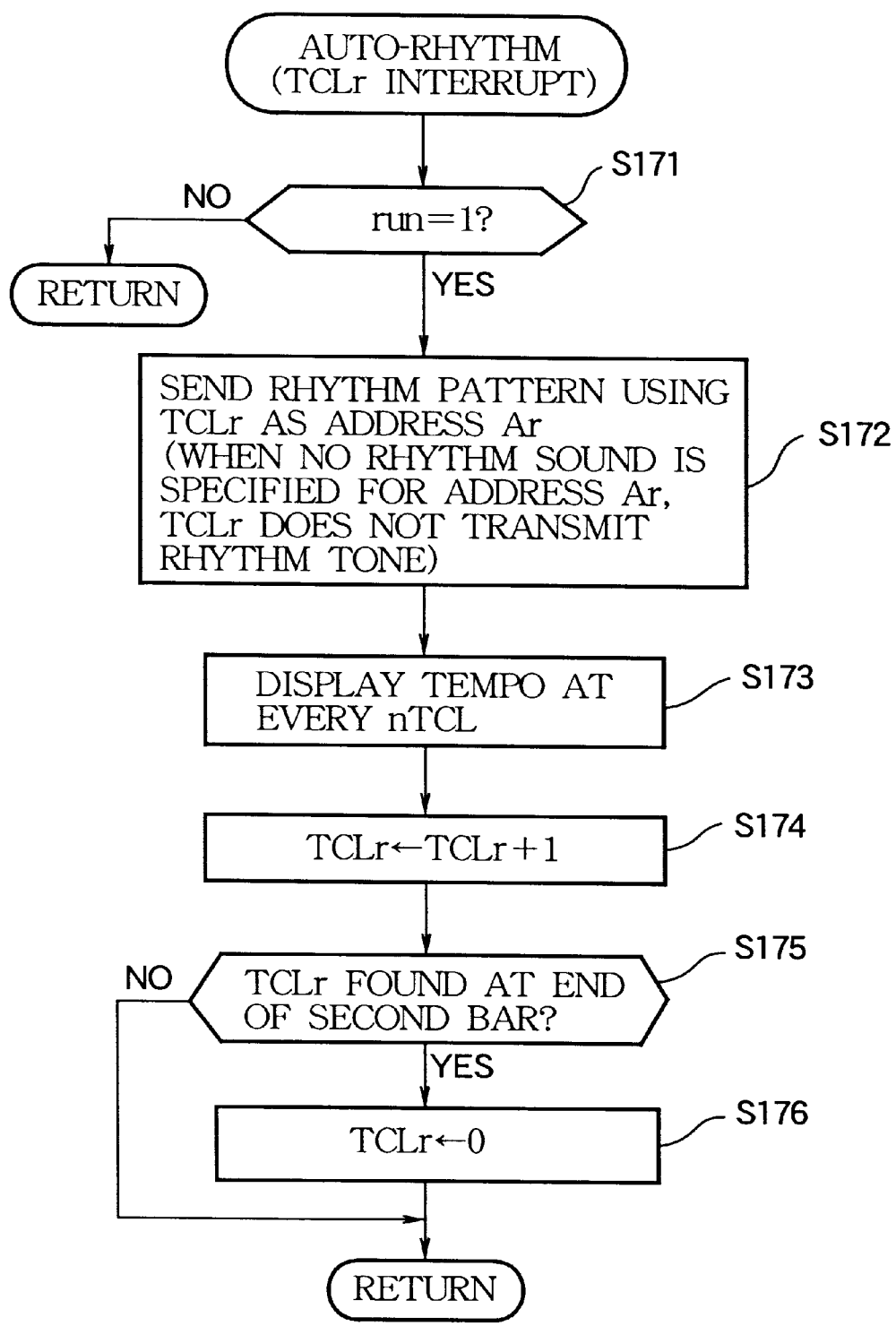
FIG. 13 is a flowchart using a timer interrupt to perform the auto-rhythm.

FIG. 13 is a flowchart for using a timer interrupt to perform the auto-rhythm. Auto-rhythm tempo clock TCLr is used for an interrupt. This TCLr can have the same cycle as the hitherto used tempo clock TCL, but is used independently.

At step S171, it is determined whether variable run is 1. If run=1, the process proceeds to step S172. If not, the interrupt process terminates.

At step S172, the process sends a rhythm pattern using auto-rhythm tempo clock TCLr as address Ar to the tone generating circuit. When no rhythm instrument to be sounded is specified for address Ar, that TCLr does not transmit a rhythm tone.

At step S173, the indicator visualizes the tempo at n-clock interval based on auto-rhythm tempo clock TCLr. At step S174, auto-rhythm tempo clock TCLr is incremented by one. At step S175, it is determined whether auto-rhythm tempo clock TCLr reaches the end of the second bar. If TCLr reaches the end of the second bar, the process proceeds to step S176. If not, the interrupt process terminates.

At step S176, auto-rhythm tempo clock TCLr is reset to 0 to terminate the interrupt process.

The aforementioned interrupt process can always sound an auto-rhythm tone in units of two bars and display the tempo. As a result, this makes it easy to take precise timing to start participating the performance in the middle.

An auto-rhythm tone can be selected from a plurality of rhythm patterns stored in ROM 33 in FIG. 5. Alternatively, auto-rhythm tones can be stored in the auto-play file 21 in FIG. 3 together with auto-play chord data (APC) and auto-play melody data (APM).

Suppose that the auto-play file 21 stores auto-play chord data (APC) and auto-play melody data (APM) as shown in FIG. 3. Either data can be used for illumination control and performance assistance as model song data for the user performance. The other data can substitute for the aforementioned auto-rhythm when the data is just sounded in the auto-play mode.

It may be preferable to replace the auto-rhythm with an auto bass which automatically plays a repeated base tone.

There has been described an example of the electronic musical instrument having the guitar based-operation mechanism as shown in FIG. 1.

However, the present invention is also applicable to an electronic musical instrument which synchronizes a pitch specification section with a sound specification section for providing different performance operations. Also in this case, the present invention can assist the performance and check performance operations. Especially, the present invention is optimal for an electronic musical instrument like a guitar whose string requires a performance operation for simultaneously specifying the pitch and the sound at a plurality of channels.

The sound specification section may specify sound timing not only by plucking a string like the plucking member 8 as shown in FIG. 1, but also by rubbing a string to generate trigger. In this case, the electronic musical instrument will be modeled on a "viola da gamba".

If the pitch specification section can optically detect a pressed finger position rather than using fret switches, the electronic musical instrument may have the operation mechanism modeled on a "violin".

There have been described the modes for assisting the performance and the mode for the fully manual performance as shown in FIG. 2. Further, it may be preferable to provide an operation mode for fully automatic performance without requiring the user's performance.

In this case, it is possible to provide visual effects on the automatic performance by sounding song data stored in the auto-play file 21 and providing control to activate the illuminating LED-equipped fret switch 6 and the open string notification LED 4.

It may be preferable to allow the user's hand or finger to feel the vibration by vibrating the plucking member 8 in FIG. 1 at the timing to pick a string as an operation guidance for each string.

For example, the configuration for this design is as follows. Trigger signal generated by the piezo-sensor displacement detects a picking operation of each plucking member 8. This piezo-sensor just needs to be operated reversely. Auto-play data provides an electric vibration signal for picking indication. This signal is applied to the piezo-sensor at the timing for picking.

When a low-frequency signal at 8 to 100 Hz is applied, it is possible to transmit vibration to a finger for picking the string. This configuration is appropriate visually handicapped users. The vibration is not limited to a lateral direction, but may be a longitudinal direction.

Another configuration may use a plucking member comprising transparent or semitransparent resin. The plucking member itself can be illuminated by entering visible light as a picking indication guidance signal from a connection section between the plucking member and the musical instrument itself.

While the aforementioned description has presented the model based on a six-string guitar, there is no limitation on the number of plucking members (strings) and the number of fret switches corresponding to the number of strings. When the model is based on a ukulele, four strings are used.

It is not necessary to use all plucking members (strings) and all columns of fret switches corresponding to these strings. For example, it may be preferable to use four out of six strings by setting a ukulele mode. Using a different number of strings necessitates different relationship (lookup table) among chord names, string numbers, and fret numbers.

In the above described embodiments, the model music performance data is provided in the form of an auto-play file and a MIDI file. Such a file for auto-play is stored in an external storage device such as the ROM 33 and the memory card 44 as shown in FIG. 5. Otherwise, such a file can be downloaded to the external storage device such as the memory card 44 from a server through Internet or LAN, or transferred to the RAM 33 from a server through Internet or LAN for stream reproduction.

However, the music performance data is not limited to the digital data file format. Alternatively, MIDI data may be used for designating the target timing of each note by timing input of MIDI devices. Such a MIDI data may be inputted from an external electronic musical instrument or a sequencer through a MIDI interface in realtime basis. For example, in a music school, a teacher can present students the music performance data in realtime by playing the model music piece with an instrument such as an electronic musical instrument or an acoustic instrument capable of outputting MIDI data. The music performance data inputted by manual play may be transferred to one or more of the inventive music electronic instruments having the visual assist capability through MIDI interfaces. The users or students use the inventive music electronic instruments having the visual assist capability to practice the model music piece under the automatic assistance in the adequate grade. The music performance data inputted by manual play of the teacher may be transferred to one or more of the inventive music electronic instruments through Internet or LAN in realtime basis. By such a configuration, the teacher can remotely train the students.

The realtime MIDI data is utilized as the model music performance data, the MIDI data is inputted through the MIDI interface 45 or the communication interface 46 shown in FIG. 5, and is then sequentially stored in an input event buffer provided in the RAM 34. To process the MIDI data in the buffer, the timer interrupt routine described with reference to FIGS. 5 and 12 is modified as follows. Namely, the routine checks whether the input event buffer stores a new MIDI event, i.e., note on event with designation of pitch. If YES, the routine retrieves the MIDI event from the buffer, and allocates the note on event to an appropriate string channel together with the pitch by referencing the lookup table shown in FIG. 4(b).

In case that the MIDI data is inputted in a sequence of chord events, the routine checks whether the input event buffer stores a new MIDI event, i.e., note on event with designation of chord. If YES, the routine retrieves the MIDI event from the buffer, and allocates a set.of notes constituting the chord to appropriate string channels together with the respective pitches by referencing the lookup table shown in FIG. 4(a). The MIDI note event and the MIDI chord event can be arranged distinctively from each other by MIDI channels or else, such that the two kinds of MIDI events can be distributed to separate buffers for further processing.

Figure 14:
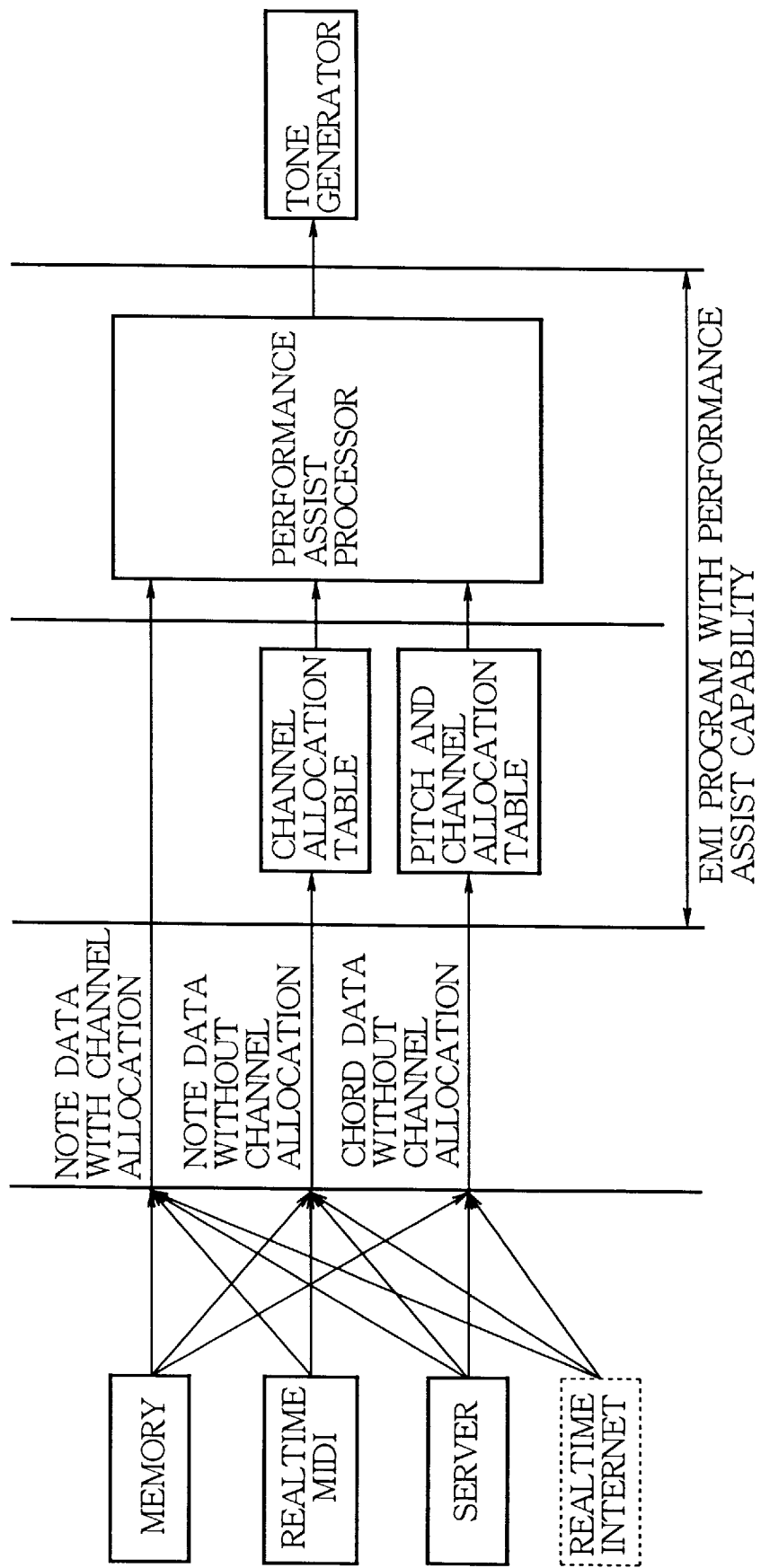
FIG. 14 is a schematic diagram illustrating the total system configuration covering the various aspects of the invention.

Lastly, the total system configuration covering the various aspects of the invention is illustrated schematically in FIG. 14. The inventive electronic musical apparatus includes a data input section composed of a memory, a realtime, MIDI device or a server, and inputs the music performance data designed to specify allocation of the notes to the channels corresponding to the strings and also designed to specify the target pitch and the target timing of each note in each channel. Accordingly, the inputted music performance data can be utilized as it is to assist in the music performance of the model music piece without further processing of the inputted music performance data by a lookup table for allocation of the notes to the channels.

The data input section may inputs the music performance data which contains note event data effective to specify the target timing and the target pitch of each note. In such a case, an allocating section composed of a performance assist processor uses a channel allocation table for allocating each note to an appropriate channel according to the specified target pitch of each note along with the specified target timing. Accordingly, the music performance data having no channel information can be used to assist in the music performance of the model music piece by allocating the notes to the appropriate channels based on the target pitch of the notes.

The data input section may input the music performance data which contains chord event data effective to specify a plurality of chords and which is arranged to specify the target timing of each chord. The allocating section uses a pitch and channel allocation table for specifying a set of notes constituting each chord according to the chord event data and for allocating the set of the notes to appropriate channels along with the specified target timing. Accordingly, the music performance data containing chord data can be sufficiently used to assist in the music performance of the model music piece even if the music performance data has no channel information and no target pitch information of each chord note.

The data input section composed of the memory device may input the note event data, which contains time information effective to prescribe the target timing of each note. The music performance data may be inputted in the digital data form such as an auto-play file, a standard MIDI file and a dedicated MIDI file for sequencer software. Such a format of the music performance data can be stream-reproduced or downloaded from a server through Internet or LAN.

The data input section composed of the realtime MIDI device may input the note event data, which contains manual timing inputs effective to specify the target timing of each note. Accordingly, the target timings of the notes constituting the model music piece can be designated by timing inputs on a manual music keyboard or else. Such a music performance data can be inputted in the form of MIDI data externally through a MIDI interface in realtime basis. Such a music performance data may be provided from a server through Internet or LAN in realtime basis.

According to the invention, as described above, the electronic music apparatus can automatically execute a part of manual input operations including pitch inputs and timing inputs instead of the player for assistance in the music performance by the user. The inventive electronic music apparatus has an indicator visually indicating target timings for respective channels, thereby guiding the music performance. By means of the inventive apparatus, the user can first practice plucking operation, and then may practice combination of the plucking operation and fretting operation, thereby stepwise upgrading the skill of the music performance.

What is claimed is:

1. An electronic musical apparatus with assistance for a performance based on music performance data representative of a model music piece composed of a plurality of notes allocated to a plurality of channels, each note being determined in terms of a target pitch and a target timing, the apparatus comprising:

an indicator section that visually indicates the target timings of the notes in correspondence with the respective channels according to the music performance data to thereby visually prompt a progression of the model music piece;

an input section operable by a user for sequentially inputting actual timings selectively allocated to one or more of the channels during the course of the performance of the model music piece;

a detecting section operative when the input section inputs an actual timing to one channel, for detecting a note having a target timing which matches the inputted actual timing and which is allocated to any one of the channels; and an output section responsive to the detecting section for outputting the music performance data to the respective channels for sounding all of the notes having the target timings coincident with the inputting of the actual timing.

2. The electronic musical apparatus according to claim 1, further comprising a data input section that inputs the music performance data designed to specify allocation of the notes to the channels and also designed to specify the target pitch and the target timing of each note in each channel.

3. The electronic musical apparatus according to claim 2, wherein the data input section inputs the music performance data, which contains time information effective to prescribe the target timing of each note.

4. The electronic musical apparatus according to claim 2, wherein the data input section inputs the music performance data, which contains manual timing inputs effective to specify the target timing of each note.

5. The electronic musical apparatus according to claim 1, further comprising a data input section that inputs the music performance data which contains note event data effective to specify the target timing and the target pitch of each note, and an allocating section that allocates each note to an appropriate channel according to the specified target pitch of each note along with the specified target timing.

6. The electronic musical apparatus according to claim 5, wherein the data input section inputs the note event data, which contains time information effective to prescribe the target timing of each note.

7. The electronic musical apparatus according to claim 5, wherein the data input section inputs the note event data, which contains manual timing inputs effective to specify the target timing of each note.

8. The electronic musical apparatus according to claim 1, further comprising a data input section that inputs the music performance data which contains chord event data effective to specify a plurality of chords and which is arranged to specify the target timing of each chord, and an allocating section that specifies a set of notes constituting each chord according to the chord event data and that allocates the set of the notes to appropriate channels along with the specified target timing.

9. The electronic musical apparatus according to claim 8, wherein the data input section inputs the music performance data, which contains time information effective to prescribe the target timing of each chord.

10. The electronic musical apparatus according to claim 8, wherein the data input section inputs the music performance data, which contains manual timing inputs effective to specify the target timing of each chord.

11. An electronic musical apparatus with assistance for a performance based on music performance data representative of a model music piece composed of a plurality of notes allocated to a plurality of channels, each note being determined in terms of a target pitch and a target timing, the model music piece containing a set of notes having the same target timing, the apparatus comprising:

an indicator section that visually indicates the target timings of the notes in correspondence with the respective channels according to the music performance data to thereby visually prompt a progression of the model music piece;

an input section operable by a user for sequentially inputting actual timings selectively allocated to one or more of the channels during the course of the performance of the model music piece;

a detecting section operative when the input section inputs an actual timing to one or more channels, for detecting a note having a target timing which matches the inputted actual timing and which is allocated to said one or more channels among the set of the notes; and an output section responsive to the detecting section for outputting the music performance data to said one or more channels, thereby sounding the detected note at the target pitch through said one or more channels.

12. The electronic musical apparatus according to claim 11, further comprising a data input section that inputs the music performance data designed to specify allocation of the notes to the channels and also designed to specify the target pitch and the target timing of each note in each channel.

13. The electronic musical apparatus according to claim 12, wherein the data input section inputs the music performance data, which contains time information effective to prescribe the target timing of each note.

14. The electronic musical apparatus according to claim 12, wherein the data input section inputs the music performance data, which contains manual timing inputs effective to specify the target timing of each note.

15. The electronic musical apparatus according to claim 11, further comprising a data input section that inputs the music performance data which contains note event data effective to specify the target timing and the target pitch of each note, and an allocating section that allocates each note to an appropriate channel according to the specified target pitch of each note along with the specified target timing.

16. The electronic musical apparatus according to claim 15, wherein the data input section inputs the note event data, which contains time information effective to prescribe the target timing of each note.

17. The electronic musical apparatus according to claim 15, wherein the data input section inputs the note event data, which contains manual timing inputs effective to specify the target timing of each note.

18. The electronic musical apparatus according to claim 11, further comprising a data input section that inputs the music performance data which contains chord event data effective to specify a plurality of chords and which is arranged to specify the target timing of each chord, and an allocating section that specifies a set of notes constituting each chord according to the chord event data and that allocates the set of the notes to appropriate channels along with the specified target timing.

19. The electronic musical apparatus according to claim 18, wherein the data input section inputs the music performance data, which contains time information effective to prescribe the target timing of each chord.

20. The electronic musical apparatus according to claim 18, wherein the data input section inputs the music performance data, which contains manual timing inputs effective to specify the target timing of each chord.

21. An electronic musical apparatus with assistance for a performance based on music performance data representative of a model music piece composed of a plurality of notes allocated to a plurality of channels, the model music piece containing a single note allocated to a specified channel, each note being determined in terms of a target pitch and a target timing, the apparatus comprising:

an indicator section that visually indicates the target timings of the notes in correspondence with the respective channels according to the music performance data to thereby visually prompt a progression of the model music piece;

an input section operable by a user for sequentially inputting actual timings selectively allocated to one or more of the channels during the course of the performance of the model music piece;

a detecting section operative when the input section inputs an actual timing to the specified channel, for detecting a single note having a target timing which matches the inputted actual timing and which is allocated to the specified channel; and an output section responsive to the detecting section for outputting the music performance data to the specified channel, thereby sounding the detected single note at the target pitch through the specified channel.

22. The electronic musical apparatus according to claim 21, further comprising a data input section that inputs the music performance data designed to specify allocation of the notes to the channels and also designed to specify the target pitch and the target timing of each note in each channel.

23. The electronic musical apparatus according to claim 22, wherein the data input section inputs the music performance data, which contains time information effective to prescribe the target timing of each note.

24. The electronic musical apparatus according to claim 22, wherein the data input section inputs the music performance data, which contains manual timing inputs effective to specify the target timing of each note.

25. The electronic musical apparatus according to claim 21, further comprising a data input section that inputs the music performance data which contains note event data effective to specify the target timing and the target pitch of each note, and an allocating section that allocates each note to an appropriate channel according to the specified target pitch of each note along with the specified target timing.

26. The electronic musical apparatus according to claim 25, wherein the data input section inputs the note event data, which contains time information effective to prescribe the target timing of each note.

27. The electronic musical apparatus according to claim 25, wherein the data input section inputs the note event data, which contains manual timing inputs effective to specify the target timing of each note.

28. An electronic musical apparatus with assistance for a performance based on music performance data representative of a model music piece composed of a plurality of notes allocated to a plurality of channels, each note being determined in terms of a target pitch and a target timing, the apparatus comprising:

an indicator section that visually indicates the target timings of the notes in correspondence with the respective channels according to the music performance data to thereby visually prompt a progression of the model music piece;

an input section operable by a user for sequentially inputting actual timings selectively allocated to one or more of the channels during the course of the performance of the model music piece;

a selecting section that selects either of a first mode applicable when the model music piece contains one or more notes at one timing, a second mode applicable when the model music piece contains multiple notes at one timing and a third mode applicable when the model music piece contains a single note at one timing; and an output section being operative when the input section inputs an actual timing to one channel under the first mode, for detecting a note having a target timing which matches the inputted actual timing and which is allocated to any one of the channels, and then outputting the music performance data to the respective channels for sounding all of the notes having the target timings coincidentally with the inputting of the actual timing, the output section being operative when the input section inputs an actual timing to one or more channel under the second mode for detecting a note having a target timing which matches the inputted actual timing and which is allocated to said one or more channel among the multiple notes, and then outputting the music performance data to said one or more channel, thereby sounding the detected note at the target pitch through said one or more channel, and the output section being operative when the input section inputs an actual timing to a specified channel under the third mode for detecting a single note having a target timing which matches the inputted actual timing and which is allocated to the specified channel, and then outputting the music performance data to the specified channel, thereby sounding the detected single note at the target pitch through the specified channel.

29. The electronic musical apparatus according to claim 28, further comprising a data input section that inputs the music performance data designed to specify allocation of the notes to the channels and also designed to specify the target pitch and the target timing of each note in each channel.

30. The electronic musical apparatus according to claim 29, wherein the data input section inputs the music performance data, which contains time information effective to prescribe the target timing of each note.

31. The electronic musical apparatus according to claim 29, wherein the data input section inputs the music performance data, which contains manual timing inputs effective to specify the target timing of each note.

32. The electronic musical apparatus according to claim 28, further comprising a data input section that inputs the music performance data which contains note event data effective to specify the target timing and the target pitch of each note, and an allocating section that allocates each note to an appropriate channel according to the specified target pitch of each note along with the specified target timing.

33. The electronic musical apparatus according to claim 32, wherein the data input section inputs the note event data, which contains time information effective to prescribe the target timing of each note.

34. The electronic musical apparatus according to claim 32, wherein the data input section inputs the note event data, which contains manual timing inputs effective to specify the target timing of each note.

35. The electronic musical apparatus according to claim 28, further comprising a data input section that inputs the music performance data which contains chord event data effective to specify a plurality of chords and which is arranged to specify the target timing of each chord, and an allocating section that specifies a set of notes constituting each chord according to the chord event data and that allocates the set of the notes to appropriate channels along with the specified target timing.

36. The electronic musical apparatus according to claim 35, wherein the data input section inputs the music performance data, which contains time information effective to prescribe the target timing of each chord.

37. The electronic musical apparatus according to claim 35, wherein the data input section inputs the music performance data, which contains manual timing inputs effective to specify the target timing of each chord.

38. An electronic musical apparatus with assistance for a performance based on music performance data representative of a model music piece composed of a plurality of notes allocated to a plurality of channels, each note being determined in terms of a target pitch and a target timing, the apparatus comprising:

an indicator section that visually indicates the target timings and the target pitches of at least a part of the notes in correspondence with the respective channels according to the music performance data to thereby visually prompt a progression of the model music piece;

a timing input section operable by a user for inputting a current timing to any one or more of the channels;

a pitch input section operable by a user for inputting an actual pitch to a particular channel;

a detecting section that detects a note having a target timing matching the current timing and a target pitch matching the actual pitch in the particular channel; and an output section responsive to the detecting section for outputting the music performance data to the respective channels for sounding the detected note and other note having the target timing matching the current timing.

39. The electronic musical apparatus according to claim 38, further comprising a data input section that inputs the music performance data designed to specify allocation of the notes to the channels and also designed to specify the target pitch and the target timing of each note in each channel.

40. The electronic musical apparatus according to claim 39, wherein the data input section inputs the music performance data, which contains time information effective to prescribe the target timing of each note.

41. The electronic musical apparatus according to claim 39, wherein the data input section inputs the music performance data, which contains manual timing inputs effective to specify the target timing of each note.

42. The electronic musical apparatus according to claim 38, further comprising a data input section that inputs the music performance data which contains note event data effective to specify the target timing and the target pitch of each note, and an allocating section that allocates each note to an appropriate channel according to the specified target pitch of each note along with the specified target timing.

43. The electronic musical apparatus according to claim 42, wherein the data input section inputs the note event data, which contains time information effective to prescribe the target timing of each note.

44. The electronic musical apparatus according to claim 42, wherein the data input section inputs the note event data, which contains manual timing inputs effective to specify the target timing of each note.

45. The electronic musical apparatus according to claim 38, further comprising a data input section that inputs the music performance data which contains chord event data effective to specify a plurality of chords and which is arranged to specify the target timing of each chord, and an allocating section that specifies a set of notes constituting each chord according to the chord event data and that allocates the set of the notes to appropriate channels along with the specified target timing.

46. The electronic musical apparatus according to claim 45, wherein the data input section inputs the music performance data, which contains time information effective to prescribe the target timing of each chord.

47. The electronic musical apparatus according to claim 45, wherein the data input section inputs the music performance data, which contains manual timing inputs effective to specify the target timing of each note.

48. The electronic musical apparatus according to claim 38, wherein the output section outputs the music performance data to the respective channels for sounding the detected note and other note having the target timing matching the current timing, such that the sounded notes constitutes a chord including a root chord.

49. An electronic musical apparatus with assistance for a performance based on music performance data representative of a model music piece composed of a plurality of notes allocated to a plurality of channels, each note being determined in terms of a target pitch and a target timing, the apparatus comprising:

an indicator section that visually indicates the target pitches and the target timings of the notes in correspondence with at least a part of the channels according to the music performance data to thereby visually prompt a progression of the model music piece;

a timing input section operable by a user for inputting a current timing to a first channel;

a pitch input section operable by a user for inputting an actual pitch to a second channel;

a detecting section that detects one note having a target timing matching the current timing and a target pitch matching the actual pitch in the second channel, and that detects another note having a target timing matching the current timing in the first channel; and an output section responsive to the detecting section for outputting the music performance data to the respective channels, thereby sounding all of the notes having the target timing matching the current timing and including said one note and said another note.

50. The electronic musical apparatus according to claim 49, further comprising a data input section that inputs the music performance data designed to specify allocation of the notes to the channels and also designed to specify the target pitch and the target timing of each note in each channel.

51. The electronic musical apparatus according to claim 50, wherein the data input section inputs the music performance data, which contains time information effective to prescribe the target timing of each note.

52. The electronic musical apparatus according to claim 50, wherein the data input section inputs the music performance data, which contains manual timing inputs effective to specify the target timing of each note.

53. The electronic musical apparatus according to claim 49, further comprising a data input section that inputs the music performance data which contains note event data effective to specify the target timing and the target pitch of each note, and an allocating section that allocates each note to an appropriate channel according to the specified target pitch of each note along with the specified target timing.

54. The electronic musical apparatus according to claim 53, where in the data input section inputs the note event data, which contains time information effective to prescribe the target timing of each note.

55. The electronic musical apparatus according to claim 53, wherein the data input section inputs the note event data, which contains manual timing inputs effective to specify the target timing of each note.

56. The electronic musical apparatus according to claim 49, further comprising a data input section that inputs the music performance data which contains chord event data effective to specify a plurality of chords and which is arranged to specify the target timing of each chord, and an allocating section that specifies a set of notes constituting each chord according to the chord event data and that allocates the set of the notes to appropriate channels along with the specified target timing.

57. The electronic musical apparatus according to claim 56, wherein the data input section inputs the music performance data, which contains time information effective to prescribe the target timing of each chord.

58. The electronic musical apparatus according to claim 56, wherein the data input section inputs the music performance data, which contains manual timing inputs effective to specify the target timing of each chord.

59. The electronic musical apparatus according to claim 49, wherein the output section outputs the music performance data to the respective channels, thereby sounding all of the notes having the target timing matching the current timing and including said one note and said another note, such that the sounded notes constitute a chord containing a root note.

60. An electronic musical apparatus with assistance for a performance based on music performance data representative of a model music piece composed of a plurality of notes allocated to a plurality of channels, each note being determined in terms of a target pitch and a target timing, the apparatus comprising:
   an indicator section that visually indicates the target pitches and the target timings of the notes in correspondence with the channels according to the music performance data to thereby visually prompt a progression of the model music piece;
   a timing input section operable by a user for inputting a current timing to a first channel;
   a pitch input section operable by a user for inputting an actual pitch to a second channel;
   a detecting section that detects a note having a target timing matching the current timing and a target pitch matching the actual pitch in the second channel, and further detects that the first channel inputted with the current timing is identical to the second channel inputted with the actual pitch; and
   an output section responsive to the detecting section for outputting the music performance data to the second channel, thereby sounding the detected note.

61. The electronic musical apparatus according to claim 60, further comprising a data input section that inputs the music performance data designed to specify allocation of the notes to the channels and also designed to specify the target pitch and the target timing of each note in each channel.

62. The electronic musical apparatus according to claim 61, wherein the data input section inputs the music performance data, which contains time information effective to prescribe the target timing of each note.

63. The electronic musical apparatus according to claim 61, wherein the data input section inputs the music performance data, which contains manual timing inputs effective to specify the target timing of each note.

64. The electronic musical apparatus according to claim 60, further comprising a data input section that inputs the music performance data which contains note event data effective to specify the target timing and the target pitch of each note, and an allocating section that allocates each note to an appropriate channel according to the specified target pitch of each note along with the specified target timing.

65. The electronic musical apparatus according to claim 64, wherein the data input section inputs the note event data, which contains time information effective to prescribe the target timing of each note.

66. The electronic musical apparatus according to claim 64, wherein the data input section inputs the note event data, which contains manual timing inputs effective to specify the target timing of each note.

67. The electronic musical apparatus according to claim 60, further comprising a data input section that inputs the music performance data which contains chord event data effective to specify a plurality of chords and which is arranged to specify the target timing of each chord, and an allocating section that specifies a set of notes constituting each chord according to the chord event data and that allocates the set of the notes to appropriate channels along with the specified target timing.

68. The electronic musical apparatus according to claim 67, wherein the data input section inputs the music performance data, which contains time information effective to prescribe the target timing of each chord.

69. The electronic musical apparatus according to claim 67, wherein the data input section inputs the music performance data, which contains manual timing inputs effective to specify the target timing of each chord.

70. An electronic musical apparatus with assistance for a performance based on music performance data representative of a music piece composed of a plurality of notes being allocated to a plurality of channels and including a set of notes constituting a chord, each note being determined in terms of a target pitch and a target timing, the apparatus comprising:
   an indicator section that visually indicates at least the target timings of the notes in correspondence with the channels according to the music performance data to thereby visually prompt a progression of the music piece;
   a timing input section operable by a user for inputting a current timing to a channel;
   a detecting section for detecting that the inputted current timing matches a target timing of one of the notes constituting the chord; and
   an output section responsive to the detecting section for outputting the music performance data to the respective channels, thereby sounding the notes constituting the chord and having the target timing matching the current timing while suppressing the sounding of other note which is not involved in the chord.

71. The electronic musical apparatus according to claim 70, further comprising a data input section that inputs the music performance data designed to specify allocation of the notes to the channels and also designed to specify the target pitch and the target timing of each note in each channel.

72. The electronic musical apparatus according to claim 71, wherein the data input section inputs the music performance data, which contains time information effective to prescribe the target timing of each note.

73. The electronic musical apparatus according to claim 71, wherein the data input section inputs the music performance data, which contains manual timing inputs effective to specify the target timing of each note.

74. The electronic musical apparatus according to claim 70, further comprising a data input section that inputs the music performance data which contains note event data effective to specify the target timing and the target pitch of each note, and an allocating section that allocates each note to an appropriate channel according to the specified target pitch of each note along with the specified target timing.

75. The electronic musical apparatus according to claim 74, wherein the data input section inputs the note event data, which contains time information effective to prescribe the target timing of each note.

76. The electronic musical apparatus according to claim 74, wherein the data input section inputs the note event data, which contains manual timing inputs effective to specify the target timing of each note.

77. The electronic musical apparatus according to claim 70, further comprising a data input section that inputs the music performance data which contains chord event data effective to specify a plurality of chords and which is arranged to specify the target timing of each chord, and an allocating section that specifies a set of notes constituting each chord according to the chord event data and that allocates the set of the notes to appropriate channels along with the specified target timing.

78. The electronic musical apparatus according to claim 77, wherein the data input section inputs the music performance data, which contains time information effective to prescribe the target timing of each chord.

79. The electronic musical apparatus according to claim 77, wherein the data input section inputs the music performance data, which contains manual timing inputs effective to specify the target timing of each chord.

* * * * *